(12) United States Patent
Li et al.

(10) Patent No.: US 12,126,834 B2
(45) Date of Patent: Oct. 22, 2024

(54) PARAMETER SET SIGNALING IN DIGITAL VIDEO

(71) Applicant: ZTE Corporation, Guangdong (CN)

(72) Inventors: Ming Li, Guangdong (CN); Ping Wu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 166 days.

(21) Appl. No.: 17/468,564

(22) Filed: Sep. 7, 2021

(65) Prior Publication Data

US 2021/0409779 A1 Dec. 30, 2021

Related U.S. Application Data

(63) Continuation of application No. PCT/CN2019/077548, filed on Mar. 8, 2019.

(51) Int. Cl.
*H04N 19/70* (2014.01)
*H04N 19/169* (2014.01)
*H04N 19/172* (2014.01)
*H04N 19/176* (2014.01)

(52) U.S. Cl.
CPC ........... *H04N 19/70* (2014.11); *H04N 19/172* (2014.11); *H04N 19/188* (2014.11); *H04N 19/176* (2014.11)

(58) Field of Classification Search
None
See application file for complete search history.

(56) References Cited

U.S. PATENT DOCUMENTS

| 8,792,557 B2 | 7/2014 | Francois et al. |
| 9,398,284 B2 | 7/2016 | Chen et al. |
| 10,298,946 B2 | 5/2019 | Li et al. |
| 10,547,851 B2 | 1/2020 | Li et al. |

(Continued)

FOREIGN PATENT DOCUMENTS

| CN | 102238386 A | 11/2011 |
| CN | 103096047 A | 5/2013 |

(Continued)

OTHER PUBLICATIONS

Drugeon et al., "AHG15: Partial APS update," Joint Collaborative Team on Video Coding (JCT-VC) of ITU-T SG16 WP3 and ISO/IEC JJTC1/SC29/WG11, 8th Meeting: San Jose, CA, USA, Feb. 1-10, 2012, Document: JCTVC-H0381, 5 pages. (Year: 2012).*

(Continued)

*Primary Examiner* — Stuart D Bennett
(74) *Attorney, Agent, or Firm* — Perkins Coie LLP

(57) ABSTRACT

A bitstream processing technique includes obtaining a first parameter set identifier from a data unit containing bits corresponding to a coded video region, obtaining a tool flag from a first parameter set corresponding to the first parameter set identifier, determining, from the tool flag, that a tool parameter of a tool corresponding to the tool flag is present or enabled for decoding the coded video region, wherein the tool corresponds to a video coding technique, obtaining, based on the determining, a second parameter set identifier, obtaining the tool parameter from a second parameter set corresponding to the second parameter set identifier, and decoding the video region using the tool parameter.

20 Claims, 11 Drawing Sheets

| parameter_set_rbsp ( ) { | Descriptor |
|---|---|
| parameter_set_id | u(n) |
| info_type | u(n) |
| if ( info_type == 0 ) { | |
| tool_A_flag | u(1) |
| if (tool_A_flag) | |
| tool_A_parameter_set_id | u(n) |
| tool_B_flag | u(1) |
| if (too_B_flag) | |
| tool_B_parameter_set_id | u(n) |
| } | |
| else if ( info_type == 1 ) | |
| tool_A_parameter( ) | |
| else if (info_type == 2 ) | |
| tool_B_parameter( ) | |
| ...... // extension and byte align bits in a parameter set | |
| } | |

(56) References Cited

U.S. PATENT DOCUMENTS

| | | | |
|---|---|---|---|
| 10,728,569 | B2 | 7/2020 | Li et al. |
| 2013/0272372 | A1 | 10/2013 | Hannuksela et al. |
| 2014/0133547 | A1 | 5/2014 | Tanaka |
| 2014/0294067 | A1* | 10/2014 | Li .................. H04N 19/463 |
| | | | 375/240.02 |
| 2015/0063467 | A1* | 3/2015 | Hendry .................. H04N 19/46 |
| | | | 375/240.26 |
| 2016/0219275 | A1 | 7/2016 | Suzuki et al. |
| 2018/0124398 | A1 | 5/2018 | Park et al. |
| 2021/0258598 | A1 | 8/2021 | Hendry et al. |

FOREIGN PATENT DOCUMENTS

| | | |
|---|---|---|
| CN | 103200400 A | 7/2013 |
| CN | 103686179 A | 3/2014 |
| CN | 103748884 A | 4/2014 |
| CN | 104301738 A | 1/2015 |
| CN | 104380749 A | 2/2015 |
| CN | 104584557 A | 4/2015 |
| JP | 2014-535227 A | 12/2014 |
| JP | 2015-518683 A | 7/2015 |
| JP | 2016034050 A | 3/2016 |
| JP | 2022-506623 A | 1/2022 |
| WO | 2015007066 A1 | 1/2015 |

OTHER PUBLICATIONS

International Search Report and Written Opinion mailed on Nov. 27, 2019 for International Application No. PCT/CN2019/077548, filed on Mar. 8, 2019 (7 pages).
Hannuksela et al., "APS error resilience and partial updating," Joint Collaborative Team on Video Coding (JCT-VC) of ITU-T SG 16 WP 3 and ISO/IEC JTC 1/SC 29/WG 11, 9th Meeting: Geneva, Switzerland, Apr. 27-May 7, 2012, Document: JCTVC-I0069r1, 7 pages.
Okubo et al., "H.265/HEVC," Text Book First Edition, Impress standard textbook series, Impress Japan, Oct. 21, 2013, pp. 157-162 and 191-198, 21 pages. (English translation not available.).
Japanese office action issued in corresponding Japanese Patent Application No. 2021-553369, dated Feb. 1, 2023, 22 pages. (English summary included).
European Search Report for EP Patent Application No. 19918720.4, dated Jun. 9, 2022, 9 pages.
Li et al., "APS Referencing," Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, Document: JCTVC-H0069, 10 pages.
Wang et al., "On APS partial update," Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, Document: JCTVC-H0505r1, 5 pages.
Drugeon et al., "AHG15: Partial APS update," Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, Document: JCTVC- H0381, 5 pages.
Hendry et al., "Error resilience improvements for APS partial updates," Joint Collaborative Team on Video Coding JCT-VC) of ITU-T SG 16 WP 3 and ISO/IEC JTC 1/SC 29/WG 11, 9th Meeting: Geneva, CH, Apr. 27-May 7, 2012, Document: JCTVC-I0083, 6 pages.
Drugeon et al., "APS partial update," 8th JCT-VC meeting, San Jose, Feb. 1-10, 2012, JCTVC-H0381, 6 pages.
Chinese office action issued in CN Patent Application No. 201980093295.2, dated Jun. 20, 2022, 9 pages. English translation included.
Chinese office action issued in CN Patent Application No. 201980093295.2, dated Jan. 9, 2023, 12 pages. English translation included.
Chinese notification to complete formalities of registration issued in CN Patent Application No. 201980093295.2, dated Apr. 15, 2023, 6 pages. English translation included.
Japanese office action issued in JP Patent Application No. 2021-553369, dated Aug. 25, 2023, 5 pages. English translation included.
Korean office action issued in KR Patent Application No. 10-2021-7032372, dated Nov. 15, 2023, 8 pages. English translation included.
Japanese notice of allowance issued in JP Patent Application No. 2021-553369, dated Dec. 1, 2023, 3 pages. English translation included.
Korean office action issued in KR Patent Application No. 10-2021-7032372, dated Jul. 2, 2024, 7 pages. English translation included.
European Communication pursuant to Article 94(3) EPC issued in EP Patent Application No. 19918720.4, dated Jul. 24, 2024, 8 pages.
Li et al., "Multiple Adaptation Parameter Sets Referring," Joint Collaborative Team on Video Coding (JCT-VC) of ITU-T SG16 WP3 and ISO/IEC JTC1/SC29/WG11, Document: JCTVC-G332, 7th Meeting: Geneva, Switzerland, Nov. 21-30, 2011, WG11 No. m21894, 7 pages.

* cited by examiner

| | Descriptor |
|---|---|
| parameter_set_rbsp ( ) { | |
|   parameter_set_id | u(n) |
|   info_type | u(n) |
|   if ( info_type == 0 ) { | |
|     tool_A_flag | u(1) |
|     if (tool_A_flag) | |
|       tool_A_parameter_set_id | u(n) |
|     tool_B_flag | u(1) |
|     if (too_B_flag) | |
|       tool_B_parameter_set_id | u(n) |
|   } | |
|   else if ( info_type == 1 ) | |
|     tool_A_parameter( ) | |
|   else if (info_type == 2 ) | |
|     tool_B_parameter( ) | |
| ...... // extension and byte align bits in a parameter set | |
| } | |

FIG. 5

| | Descriptor |
|---|---|
| ..... | |
| region_parameter_set_id | u(n) |
| ..... | |

FIG. 6A

| | Descriptor |
|---|---|
| ..... | |
| if ( tool_A_enable_flag \|\| tool_B_enable_flag ) | |
| region_parameter_set_id | u(n) |
| ..... | |

FIG. 6B

PARAMETER SET SIGNALING IN DIGITAL VIDEO

CROSS-REFERENCE TO RELATED APPLICATIONS

This application is a continuation of International Patent Application No. PCT/CN2019/077548, filed on Mar. 8, 2019, the contents of which are incorporated herein by reference in their entirety.

TECHNICAL FIELD

This patent document is directed generally to video and image encoding and decoding.

BACKGROUND

Video encoding uses compression tools to encode two-dimensional video frames into a compressed bitstream representation that is more efficient for storing or transporting over a network. Efforts are currently underway to design next generation of video codecs that provide more flexibility in encoding signals and provide better video coding performance.

SUMMARY

The present document discloses video or picture encoding and decoding methods, encoding and decoding devices to at least solve problem that how to code parameters in a parameter set so that the parameters of various tools can be updated flexibly without increased complexity in activation and management of parameter sets In one example aspect, a method of bitstream processing is disclosed. The method includes obtaining a first parameter set identifier from a data unit containing bits corresponding to a coded video region, obtaining a tool flag from a first parameter set corresponding to the first parameter set identifier, determining, from the tool flag, that a tool parameter of a tool corresponding to the tool flag is present or enabled for decoding the coded video region, wherein the tool corresponds to a video coding technique, obtaining, based on the determining, a second parameter set identifier, obtaining the tool parameter from a second parameter set corresponding to the second parameter set identifier, and decoding the video region using the tool parameter.

In another example aspect, a method of encoding a video region is disclosed. The method includes determining a tool parameter of a tool used in encoding a video region, wherein the tool represents a video coding technique, generating a first parameter set that is identified by a first parameter set identifier, including, in the first parameter set, a tool flag corresponding to the tool, wherein the tool flag is set to a value indicating that the tool parameter is present or enabled for encoding the video region, including the tool parameter in the first parameter set using a second parameter set identifier, coding the first parameter set identifier in a header of the video region, and coding the video region using the tool parameter.

In yet another example aspect, a video decoder apparatus comprising a processor configured to implement an above-described method is disclosed.

In yet another aspect, a video encoder apparatus comprising a processor configured to implement an above-described method is disclosed.

In another aspect, a computer-readable medium is disclosed. The computer-readable medium has code stored thereupon, the code, when executed by a processor, causes the processor to implement an above-described method.

These, and other, aspects are further described in the present document.

BRIEF DESCRIPTION OF DRAWINGS

Accompanying drawings described herein are provided to provide a further understanding of the present description, and constitute a part of the present document. In the accompanying drawing:

FIG. 5 is a diagram illustrating an example of syntax structure for representing parameters of multiple tools in a parameter set.

FIG. 6A-6B illustrate an example of syntax structure for referencing a parameter set for tool parameters in a header of a picture or a picture region.

DETAILED DESCRIPTION

Figure 1A:
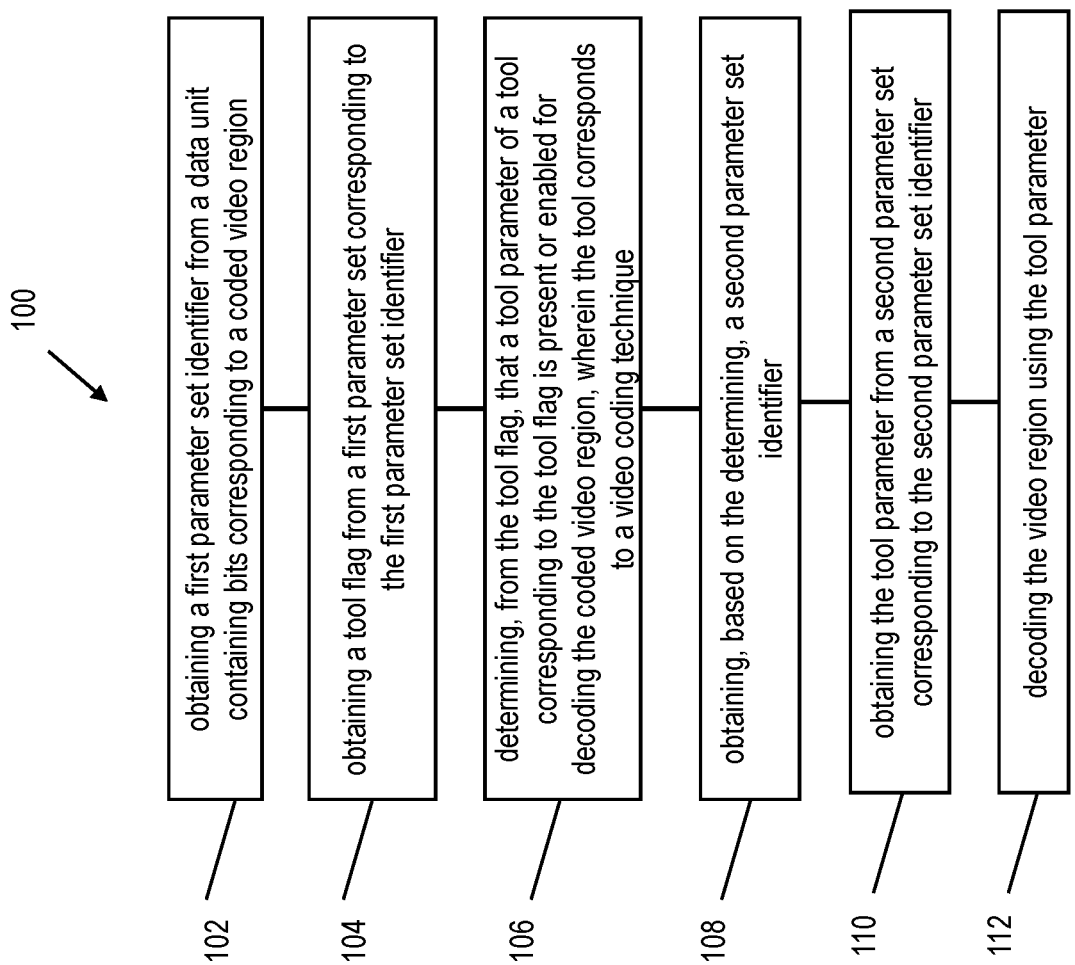
FIG. 1A is a flowchart of an example of a bitstream processing method.

Section headings are used in the present document only to improve readability and do not limit scope of the disclosed embodiments and techniques in each section to only that section. Certain features are described using the example of the H.264/AVC (advanced video coding), H.265/HEVC (high efficiency video coding) and H.266 Versatile Video Coding (VVC) standards. However, applicability of the disclosed techniques is not limited to only H.264/AVC or H.265/HEVC or H.266/VVC systems.

In this patent document, a video may be composed of a sequence of one or more pictures. A bitstream, which is also sometimes referred to as a video elementary stream, is generated by an encoder processing a video or picture. A bitstream can also be a transport stream or media file that is an output of performing a system layer process on a video elementary stream generated by a video or picture encoder. Decoding a bitstream results in a video or a picture. The system layer process is to encapsulate a video elementary stream. For example, the video elementary stream is packed into a transport stream or media file as payloads. The system layer process also includes operations of encapsulating transport stream or media file into a stream for transmission or a file for storage as payloads. A data unit generated in the system layer process is referred to as a system layer data unit. Information attached in a system layer data unit during encapsulating a payload in the system layer process is called system layer information, for example, a header of a system layer data unit. Extracting a bitstream obtains a sub-bitstream containing a part of bits of the bitstream as well as one or more necessary modifications on syntax elements by the extraction process. Decoding a sub-bitstream results in a video or a picture, which, compared to the video or picture obtained by decoding the bitstream, may be of lower resolution and/or of lower frame rate. A video or a picture obtained from a sub-bitstream could also be a region of the video or picture obtained from the bitstream.

Parameter set is a data unit in a video bitstream carrying common parameters in decoding partial, one or more pictures. Parameter set has a syntax element specifying its parameter set identifier. Generally, a decoder obtains one or maybe more parameter set identifiers in slice header (e.g. H.264/AVC standard, H.265/HEVC standard) or tile group header (in the current H.266/VVC WD (Working Draft)). That is, such parameter sets are directly or indirectly referred to by the slice or the tile group. In the decoding process, the decoder activates the parameter sets with their identifiers equal to the ones referred to the slice or the tile group.

In a video codec, one or more coding tools have a feature of picture adaptive or picture region adaptive, for example, adaptive loop filter (ALF), scaling list, sample adaptive offset (SAO) and etc. Parameter set is used to efficiently carry parameters of such tools so that such parameters can be efficiently shared among regions within a picture or among multiple pictures. In the current design of H.266/VVC WD, adaptive parameter set (APS) is employed to firstly encapsulate ALF parameters. It is expected more information with the feature of frequently changing among pictures (or even among regions in a picture) to be coded in APS. Here comes a problem that how to code parameters in APS so that the parameters of various tools can be updated flexibly without increased complexity in activation and management of parameter sets.

Problem 1:

If following the traditional way that all parameters are coded in a single APS, a problem of duplicated coded information occurs. Concretely, suppose parameters of tool A and tool B are coded in APS. Take a scenario that a following tile group (or equivalently a slice) uses the same tool A parameters as the former coded tile group but different tool B parameters for example. In this case, the encoder needs to generate a new APS containing new tool B parameters but repeated tool A information, where such tool A information leads to the waste of bits.

Problem 2:

In order to solve problem 1, JCTVC-G332 provides a method of signaling multiple APS identifiers in a single slice header. In decoding process, a decoder activates the multiple APSs and overwrites the information obtained in a previous activated APS by the information obtained in a current activated APS if the flag leading tool information is equal to 1. The problem in JCTVC-G332 is to have multiple APS identifiers in a slice header, and to have additional overwriting operations. From a perspective of encoder implementation, an encoder shall always take good care of coding tool parameters in APS to make sure that a decoder can get identical tool parameters in the activation of multiple APS following the above design, which brings computational burden and extra judgment operations to the encoder.

Problem 3:

Another kind of prior art is to separately signal APS for each tool used in decoding a slice or a tile group. Take the example in Problem 1. If tool B is used in coding a slice, an APS identifier corresponding to the APS containing tool B information is signaled in the slice header by an encoder, no matter whether this APS still contains tool A information or not. Suppose that in APS, tool B parameters are presented following tool A parameters. Here the problem is that in decoding process, a decoder has to parse tool A parameters first in the activated APS before parse tool B parameters. That is, tool A parameters may not needed in decoding this slice, and operations of parsing tool A parameters are wasting decoder's computation resource. Besides, another problem is that that only a partial information in an activated parameter set is in effect in decoding process breaks common concept and operations of "the parameters in an activated parameter are in effect".

Problem 4:

In order to solve problem 1, JCTVC-H0069 provides an APS referencing method. A first APS can refer to a second aps by signalling ref_aps_id equal to the identifier of the second APS in the first APS. In slice header, only one APS identifier is signalled. In decoding the first APS, the second APS is activated to get tool parameters. The problem is that a chain of APS linked by the APS referencing scheme raises complexity in encoder and decoder implementation. Codec has to maintain the referencing relationship to guide the storage and updating of APS buffers, and can only nail down the tool parameters (may also including enable flags of tools) by tracing the referencing chains with activations of multiple APSs. In addition, another problem is that that only a partial information in an activated parameter set is in effect in decoding process breaks common concept and operations of "the parameters in an activated parameter are in effect".

Problem 5:

In order to solve problem 1, JCTVC-H0505 provides an APS design that presents only parameters of only one tool in a single APS. JCTVC-H0505 provides a group parameter set (GPS) to collectively signal APS identifiers and other parameter set identifiers (e.g. PPS identifiers). In a slice header, a GPS identifier is signalled to indicate the parameter sets that are to be activated to decode this slice. The problem of JCTVC-H0505 design is increased complexity of handling a new parameter set (i.e. GPS). Another problem resides in the fact that since generally parameters in APS change more frequently than those in other parameter sets (e.g. PPS), GPS needs to update APS identifiers frequently, which leads to repeatedly coding of other information in GPS that are not changed picture by picture (e.g. PPS identifier). A third problem is that when one or more tools in APS can be adaptive to a region of a picture, different APSs will be applied to different regions in a single picture, which also definitely leads to repeatedly coding of PPS identifiers in GPS. The above two repeatedly coding of partial information in GPS also results in complicated management of GPS buffering and referencing.

For efficient coding of parameters, a parameter set is introduced as a data unit in a video bitstream carrying common parameters in decoding partial, one or more pictures. A parameter set has a syntax element specifying its parameter set identifier. Generally, a decoder obtains one or maybe more parameter set identifiers in slice header (e.g.

H.264/AVC standard, H.265/HEVC standard) or tile group header (in the current H.266/VVC WD (Working Draft)). That is, such parameter sets are directly or indirectly referred to by the slice or the tile group. In the decoding process, the decoder activates the parameter sets with their identifiers equal to the ones referred to the slice or the tile group.

In a video codec, one or more coding tools, or coding techniques, have a feature of picture adaptive or picture region adaptive, for example, adaptive loop filter (ALF), scaling list, sample adaptive offset (SAO) and etc. A parameter set is used to efficiently carry parameters of such tools so that such parameters can be efficiently shared among regions within a picture or among multiple pictures. In the current design of H.266/VVC WD, adaptive parameter set (APS) is employed to firstly encapsulate ALF parameters. It is expected more information with the feature of frequently changing among pictures (or even among regions in a picture) to be coded in APS. Here comes a problem that how to code parameters in a parameter set so that the parameters of various tools can be updated flexibly without increased complexity in activation and management of parameter sets. This problem is common to design and implementation of a parameter set in video codec and bitstream.

According to an aspect of the embodiments described herein, there is provided an encoding method for processing video or picture, including: determining a tool parameter of a tool used in encoding a picture or a picture region; setting an identifier parameter equal to a parameter set identifier which corresponds to a parameter set containing the tool parameter; generating a first parameter set, assigning a first parameter set identifier to the first parameter set, coding a tool flag corresponding to the tool in the first parameter set equal to a value indicating that the tool parameter is presented or the tool is enabled in encoding the picture or the picture region, and coding the identifier parameter in the first parameter set; wherein the first parameter is of the same type as the parameter set containing the tool parameter; coding the first parameter set identifier in a header of the picture or the picture region; coding the picture or the picture region using the tool parameter.

According to an aspect of the embodiments disclosed herein, there is provided a decoding method for processing a bitstream to reconstruct a video or picture, including: parsing a bitstream to obtain a first parameter set identifier from a data unit containing bits corresponding to a coded picture or a coded picture region; activating a first parameter set with its identifier equal to the first parameter set identifier; obtaining a tool flag from the first parameter set; if the tool flag indicates a tool parameter of a tool corresponding to the tool flag is presented or the tool corresponding to the tool flag is enabled in decoding the coded picture or the coded picture region, obtaining a second parameter set identifier from the first parameter set; activating a second parameter set, which is of the same type as the first parameter set, with its identifier equal to the second parameter set identifier; wherein an indication parameter in the second parameter set indicates that a tool parameter contained in the second parameter set is only the tool parameter of the tool corresponding to the tool flag; obtaining the tool parameter from the second parameter set; and decoding the coded picture or the coded picture region using the tool parameter.

By means of the above methods, and other techniques described herein, parameters of various tools can be efficiently coded in a parameter set, and updated flexibly without increased complexity in activation and management of parameter sets.

Embodiment 1

Figure 2:
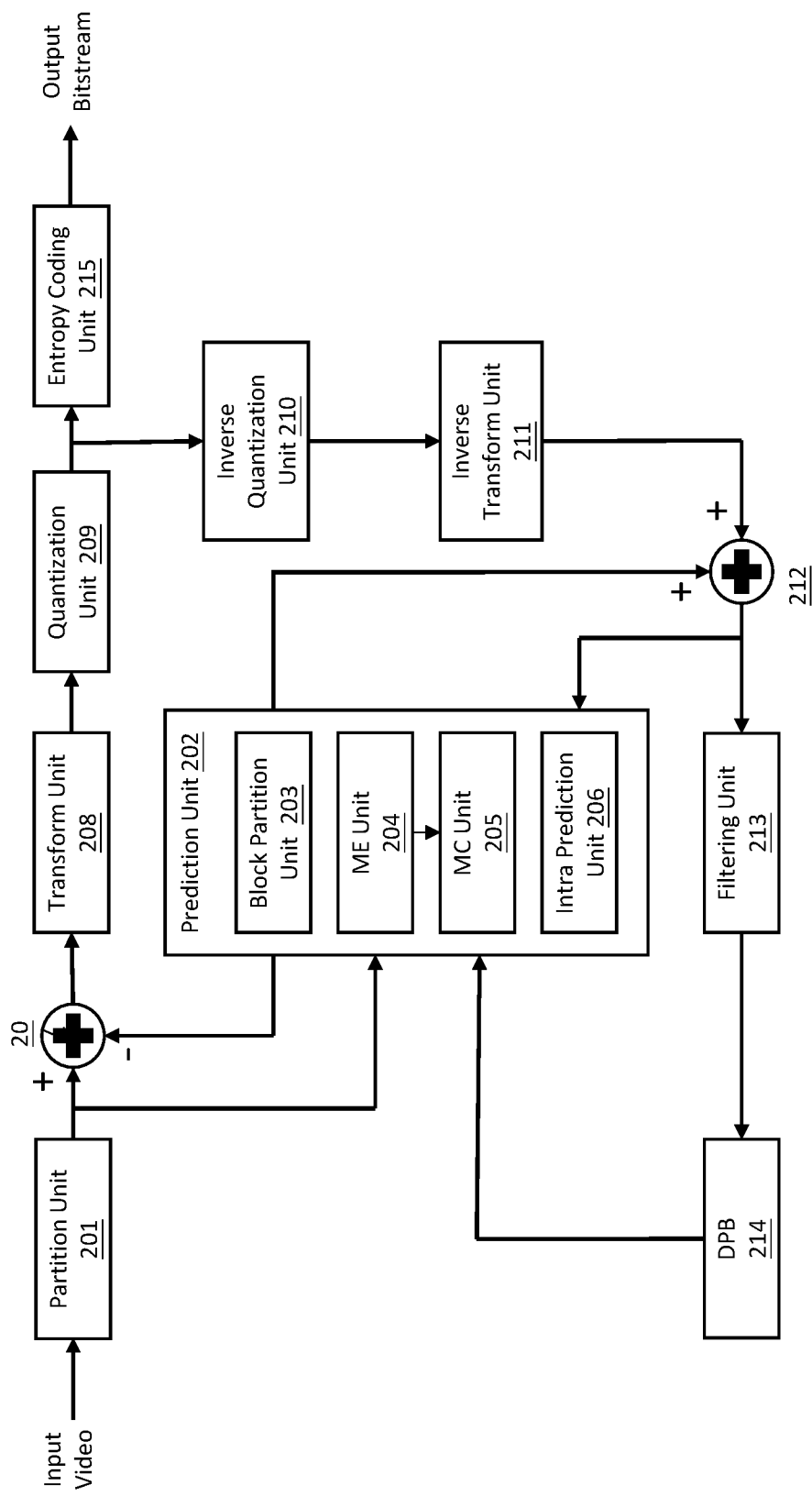
FIG. 2 is a diagram illustrating an example video or picture encoder that implements the methods in this disclosure.

FIG. 2 is a diagram illustrating an encoder utilizing the method in this disclosure in coding a video or a picture. An input of the encoder is a video, and an output is a bitstream. As the video is composed of a sequence of pictures, the encoder processes the pictures one by one in a preset order, i.e. an encoding order. The encoder order is determined according to a prediction structure specified in a configuration file for the encoder. Note that an encoding order of pictures in a video (corresponding to a decoding order of pictures at a decoder end) may be identical to, or may be different from, a displaying order of the pictures.

Partition Unit 201 partitions a picture in an input video according to a configuration of the encoder. Generally, a picture can be partitioned into one or more maximum coding blocks. Maximum coding block is the maximum allowed or configured block in encoding process and usually a square region in a picture. A picture can be partitioned into one more tiles, and a tile may contain an integer number of maximum coding blocks, or a non-integer number of maximum coding blocks. One option is a tile may contain one or more slices. That is, a tile can further be partitioned into one or more slices, and each slice may contain an integer number of maximum coding blocks, or a non-integer number of maximum coding blocks. Another option is a slice contains one or more tiles, or, a tile group contains one or more tiles. That is, one or more tiles in a certain order in the picture (e.g. raster scan order of tiles) forms a tile group. In addition, a tile group can also cover a rectangle region in a picture represented with the locations of the up-left tile and bottom-right tile. In the following descriptions, "tile group" is used as an example. Partition unit 201 can be configured to partition a picture using a fixed pattern. For example, partition unit 201 partitions a picture into tile groups, and each tile group has a single tile containing a row of maximum coding blocks. Another example is that partition unit 201 partitions a picture into multiple tiles and forms tiles in raster scan order in the picture into tile groups. Alternatively, partition unit 201 can also employ a dynamic pattern to partition the picture into tile group, tile and blocks. For example, to adapt to the restriction of maximum transmission unit (MTU) size, partition unit 201 employs dynamic tile group partitioning method to ensure that a number of coding bits of every tile group does not exceed MTU restriction.

Figure 3:
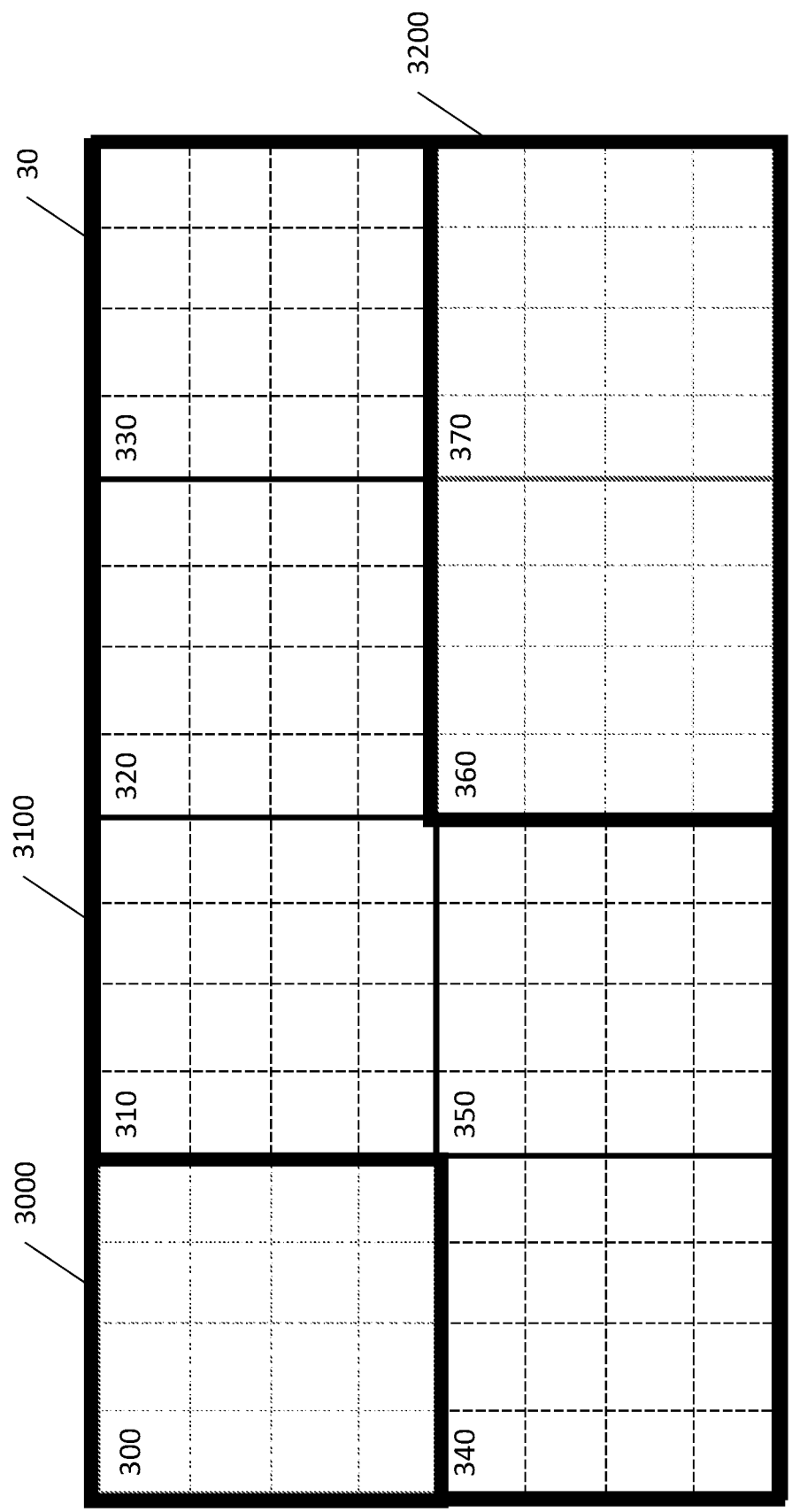
FIG. 3 is a diagram illustrating an example of partitioning a picture into tile groups.

FIG. 3 is a diagram illustrating an example of partitioning a picture into tile groups. Partition unit 201 partitions a picture 30 with 16 by 8 maximum coding blocks (depicted in dash lines) into 8 tiles 300, 310, 320, 330, 340, 350, 360 and 370. Partition unit 201 partitions picture 30 into 3 tile groups. Tile group 3000 contains tile 300, tile group 3100 contains tiles 310, 320, 330, 340, and 350, tile group 3200 contains tiles 360 and 370. Tile groups in FIG. 3 are formed in tile raster scan order in picture 30.

Figure 4:
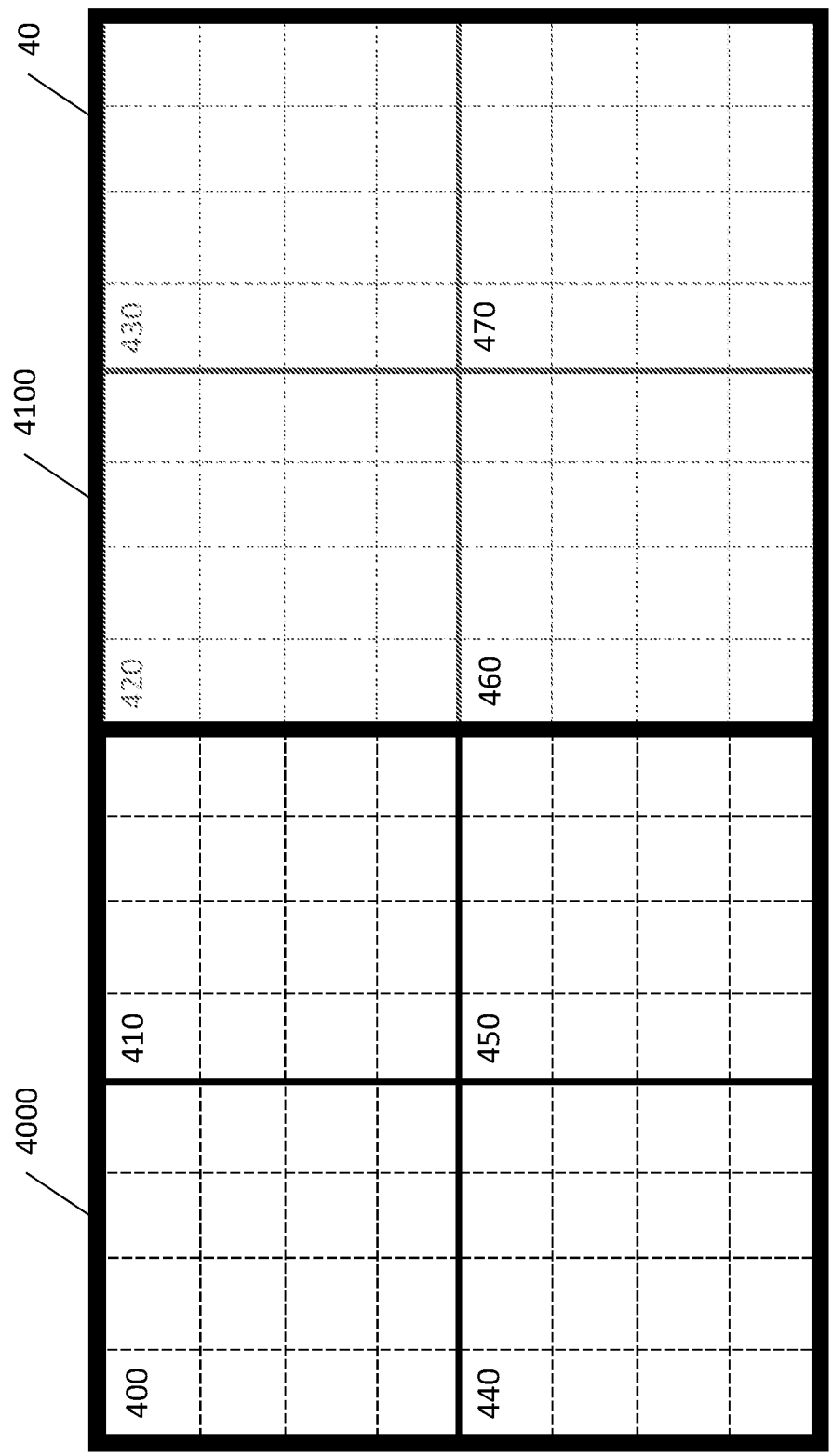
FIG. 4 is a diagram illustrating an example of partitioning a picture into tile groups.

FIG. 4 is a diagram illustrating an example of partitioning a picture into tile groups. Partition unit 201 partitions a picture 40 with 16 by 8 maximum coding blocks (depicted in dash lines) into 8 tiles 400, 410, 420, 430, 440, 450, 460 and 470. Partition unit 201 partitions picture 40 into 2 tile groups. Tile group 4000 contains tile 400, 410, 440 and 450, tile group 4100 contains tiles 420, 430, 460, and 470. Tile group 4000 is represented as up-left tile 400 and bottom-right tile 450, and tile group 4100 as up-left tile 420 and bottom-right tile 470.

One or more tile groups or tiles can be referred as a picture region. Generally, partitioning a picture into one or more tiles is conducted according to an encoder configuration file. Partition unit 201 sets a partitioning parameter to indicate a partitioning manner of the picture into tiles. For example, a partitioning manner can be to partition the picture into tiles of (nearly) equal sizes. Another example is that a partitioning manner may indicate locations of tile boundaries in rows and/or columns to facilitate flexible partitioning.

Output parameters of partition unit 201 indicates a partitioning manner of a picture.

Prediction unit 202 determines prediction samples of a coding block. Prediction unit 202 includes block partition unit 203, ME (Motion Estimation) unit 204, MC (Motion Compensation) unit 205 and intra prediction unit 206. An input of the prediction unit 202 is a maximum coding block outputted by partition unit 201 and attribute parameters associated with the maximum coding block, for example, location of the maximum coding block in a picture, in a tile group and in a tile. Prediction unit 202 partitions the maximum coding block into one or more coding blocks, which can also be further partitioned into smaller coding blocks. One or more partitioning method can be applied including quadtree, binary split and ternary split. Prediction unit 202 determines prediction samples for coding block obtained in partitioning. Optionally, prediction unit 202 can further partition a coding block into one or more prediction blocks to determine prediction samples. Prediction unit 202 employs one or more pictures in DPB (Decoded Picture Buffer) unit 214 as reference to determine inter prediction samples of the coding block. Prediction unit 202 can also employs reconstructed parts of the picture outputted by adder 212 as reference to derive prediction samples of the coding block. Prediction unit 202 determines prediction samples of the coding block and associated parameters for deriving the prediction samples, which are also output parameters of prediction unit 202, by, for example, using general rate-distortion optimization (RDO) methods.

Inside prediction unit 202, block partition unit 203 determines the partitioning of the coding block. Block partition unit 203 partitions the maximum coding block into one or more coding blocks, which can also be further partitioned into smaller coding blocks. One or more partitioning method can be applied including quadtree, binary split and ternary split. Optionally, block partition unit 203 can further partition a coding block into one or more prediction blocks to determine prediction samples. Block partition unit 203 can adopt RDO methods in the determination of partitioning of the coding block. Output parameters of block partition unit 203 includes one or more parameters indicating the partitioning of the coding block.

ME unit 204 and MC unit 205 utilize one or more decoded pictures from DPB 214 as reference picture to determine inter prediction samples of a coding block. ME unit 204 constructs one or more reference lists containing one or more reference pictures and determines one or more matching blocks in reference picture for the coding block. MC unit 205 derives prediction samples using the samples in the matching block, and calculates a difference (i.e. residual) between original samples in the coding block and the prediction samples. Output parameters of ME unit 204 indicate location of matching block including reference list index, reference index (refIdx), motion vector (MV) and etc., wherein reference list index indicates the reference list containing the reference picture in which the matching block locates, reference index indicates the reference picture in the reference list containing the matching block, and MV indicates the relative offset between the locations of the coding block and the matching block in an identical coordinate for representing locations of pixels in a picture. Output parameters of MC unit 205 are inter prediction samples of the coding block, as well as parameters for constructing the inter prediction samples, for example, weighting parameters for samples in the matching block, filter type and parameters for filtering samples in the matching block. Generally, RDO methods can be applied jointly to ME unit 204 and MC unit 205 for getting optimal matching block in rate-distortion (RD) sense and corresponding output parameters of the two units.

Specially and optionally, ME unit 204 and MC unit 205 can use the current picture containing the coding block as reference to obtain intra prediction samples of the coding block. In this disclosure, by intra prediction is meant that only the data in a picture containing a coding block is employed as reference for derive prediction samples of the coding block. In this case, ME unit 204 and MC unit 205 use reconstructed part in the current picture, wherein the reconstructed part is from the output of adder 212. An example is that the encoder allocates a picture buffer to (temporally) store output data of adder 212. Another method for the encoder is to reserve a special picture buffer in DPB 214 to keep the data from adder 212.

Intra prediction unit 206 use reconstructed part of the current picture containing the coding block as reference to obtain intra prediction samples of the coding block. Intra prediction unit 206 takes reconstructed neighboring samples of the coding block as input of a filter for deriving intra prediction samples of the coding block, wherein the filter can be an interpolation filter (e.g. for calculating prediction samples when using angular intra prediction), a low-pass filter (e.g. for calculating DC value), or cross-component filters to derive a prediction value of a (color) component using already coded (color) component. Specially, intra prediction unit 206 can perform searching operations to get a matching block of the coding block in a range of reconstructed part in the current picture, and set samples in the matching block as intra prediction samples of the coding block. Intra prediction unit 206 invokes RDO methods to determine an intra prediction mode (i.e. a method for calculating intra prediction samples for a coding block) and corresponding prediction samples. Besides intra prediction samples, output of intra prediction unit 206 also includes one or more parameters indicating an intra prediction mode in use.

Adder 207 is configured to calculate difference between original samples and prediction samples of a coding block. Output of adder 207 is residual of the coding block. The residual can be represented as an N×M 2-dimensional matrix, wherein N and M are two positive integers, and N and M can be of equal or different values.

Transform unit 208 takes the residual as its input. Transform unit 208 may apply one or more transform methods to the residual. From the perspective of signal processing, a transform method can be represented by a transform matrix. Optionally, transform unit 208 may determine to use a rectangle block (in this disclosure, square block is a special case of a rectangle block) with the same shape and size as that of the coding block to be a transform block for the residual. Optionally, transform unit 208 may determine to partition the residual into several rectangle blocks (may also including a special case that width or height of a rectangle block is one sample) and the perform transform operations on the several rectangle sequentially, for example, according to a default order (e.g. raster scan order), a predefined order (e.g. an order corresponding to a prediction mode or a transform method), a selected order for several candidate orders. Transform unit 208 may determine to perform multiple transforms on the residual. For example, transform unit 208 first perform a core transform on the residual, and then perform a secondary transform on coefficients obtained after finishing the core transform. Transform unit 208 may utilize RDO methods to determine transform parameter, which indicates execution manners used in transform process applied to the residual block, for example, partitioning of the residual block into transform blocks, transform matrix, multiple transforms, and etc. The transform parameter is included in output parameters of transform unit 208. Output parameters of transform unit 208 includes the transform parameter and data obtained after transforming the residual (e.g. transform coefficients) which could be represented by a 2-dimensional matrix.

Quantization unit 209 quantizes the data outputted by transform unit 208 after its transforming the residual. Quantizer used in quantization unit 209 can be one or both of scalar quantizer and vector quantizer. In most video encoders, quantization unit 209 employs scalar quantizer. Quantization step of a scalar quantizer is represented by quantization parameter (QP) in a video encoder. Generally, identical mapping between QP and quantization step is preset or predefined in an encoder and a corresponding decoder.

A value of QP, for example, picture level QP and/or block level QP, can be set according to a configuration file applied to an encoder, or be determined by a coder control unit in an encoder. For example, the coder control unit determines a quantization step of a picture and/or a block using rate control (RC) methods and then converts the quantization step into QP according to the mapping between QP and quantization step.

Control parameter for quantization unit 209 is QP. Output of quantization unit 209 is one or more quantized transform coefficients (i.e. known as "Level") represented in a form of a 2-dimensional matrix.

Inverse quantization 210 performs scaling operations on output of quantization 209 to get reconstructed coefficients. Inverse transform unit 211 performs inverse transform on the reconstructed coefficients from inverse quantization 210 according to the transform parameter from transform unit 208. Output of inverse transform unit 211 is reconstructed residual. Specially, when an encoder determines to skip quantizing in coding a block (e.g. an encoder implements RDO methods to determine whether applying quantization to a coding block), the encoder guides the output data of transform unit 208 to inverse transform unit 211 by bypassing quantization unit 209 and inverse quantization 210.

Adder 212 takes the reconstructed residual and prediction samples of the coding block from prediction unit 202 as input, calculates reconstructed samples of the coding block, and put the reconstructed samples into a buffer (e.g. a picture buffer). For example, the encoder allocates a picture buffer to (temporally) store output data of adder 212. Another method for the encoder is to reserve a special picture buffer in DPB 214 to keep the data from adder 212.

Filtering unit 213 performs filtering operations on reconstructed picture samples in decoded picture buffer and outputs decoded pictures. Filtering unit 213 may consist of one filter or several cascading filters. For example, according to H.265/HEVC standard, filtering unit is composed of two cascading filters, i.e. deblocking filter and sample adaptive offset (SAO) filter. Filtering unit 213 may include adaptive loop filter (ALF). Filtering unit 213 may also include neural network filters. Filtering unit 213 may start filtering reconstructed samples of a picture when reconstructed samples of all coding blocks in the picture have been stored in decoded picture buffer, which can be referred to as "picture layer filtering". Optionally, an alternative implementation (referred to as "block layer filtering") of picture layer filtering for filtering unit 213 is to start filtering reconstructed samples of a coding block in a picture if the reconstructed samples are not used as reference in encoding all successive coding blocks in the picture. Block layer filtering does not require filtering unit 213 to hold filtering operations until all reconstructed samples of a picture are available, and thus saves time delay among threads in an encoder. Filtering unit 213 determines filtering parameter by invoking RDO methods. Output of filtering unit 213 is decoded samples of a picture and filtering parameter including indication information of filter, filter coefficients, filter control parameter and etc.

The encoder stores the decoded picture from filtering unit 213 in DPB 214. The encoder may determine one or more instructions applied to DPB 214, which are used to control operations on pictures in DPB 214, for example, the time length of a picture storing in DPB 214, outputting a picture from DPB 214, and etc. In this disclosure, such instructions are taken as output parameter of DPB 214.

Entropy coding unit 215 performs binarization and entropy coding on one or more coding parameters of a picture, which converts a value of a coding parameter into a code word consisting of binary symbol "0" and "1" and writes the code word into a bitstream according to a specification or a standard. The coding parameters may be classified as texture data and non-texture. Texture data are transform coefficients of a coding block, and non-texture data are the other data in the coding parameters except texture data, including output parameters of the units in the encoder, parameter set, header, supplemental information, and etc. Output of entropy coding unit 215 is a bitstream conforming to a specification or a standard.

Entropy coding unit 215 receives the output parameters from the aforementioned units, and codes parameters that are needed to be presented in a bitstream. In this disclosure and also in the field of video coding technology, a "tool" refers to a process or unit in encoding or decoding. A tool may be a relative large unit, such as the aforementioned units. A tool may also be a relatively detailed process, such as process represented by a coding mode (e.g. merge, Planar, etc.), a filter (e.g. deblocking, SAO, ALF, NN filters, etc.), and etc. A "tool parameter" of a tool refers to one or more parameters for an encoder or a decoder to carry out the encoding or decoding operations specified by a tool. For example, a tool parameter of merge mode includes merge index of a coding block. A tool parameter of ALF includes filter coefficients.

In the encoding process, a tool may be adaptive to one or more pictures, one or more picture regions (e.g. tiles, tile groups), and one or more coding blocks. From the perspective of tool parameter, if a tool is adaptive to one or more pictures, a tool parameter of the tool does not update for all the blocks at least in a picture. Generally, when a tool is adaptive at least to one or more picture regions, entropy coding unit 215 would code tool parameter of this tool in header or in a parameter set, so that common information is shared among coding blocks at least in a picture region to save coding bits of the tool parameter.

Suppose tool A and tool B are two tools that are adaptive at least to one or more picture regions. Examples of tool A and tool B can be various filters used in filtering unit 213, and also a process with its parameters adaptive to one or more picture regions such as scaling list, reference picture set (RPS), reference picture list (RPL) and etc. Tool parameters of tool A and tool B are determined in encoding a picture or a picture region. For example, filtering unit 213 determines parameters of filters and passes such parameters to entropy coding unit 215.

Entropy coding unit 215 codes tool parameters of tool A and tool B in a parameter set. Such parameter set can be a sequence parameter set (SPS), picture parameter set (PPS), adaptive parameter set (APS), or the other parameter sets that carry common parameters for at least a picture or a picture region. FIG. 5 is a diagram illustrating an example of syntax structure for representing parameters of multiple tools in a parameter set. A syntax in bold in FIG. 5 is a syntax element represented by a string of one or more bits existing in the bitstream, and u(n) specifies representing a value as an unsigned integer using n bits, wherein n is a natural number, and can be a fixed value or a value varying in a manner depending on the value of other syntax elements. tool_A_parameter( ) and tool_B_parameter( ) in FIG. 5 are two data structures representing tool parameters for tool A and tool B, respectively.

The semantics of the syntax elements in FIG. 5 are presented as follows.
parameter_set_id identifies a parameter set for reference by other syntax elements.
info_type specifies a type of information in a parameter set.
tool_A_flag equal to 1 specifies that tool A is used. tool_A_flag equal to 0 specifies that tool A is not used.
tool_B_flag equal to 1 specifies that tool B is used. tool_B_flag equal to 0 specifies that tool B is not used.

Alternatively, the semantics for tool_A_flag and tool_B_flag can be as follows.
tool_A_flag equal to 1 specifies the presence of tool_A_parameter( ). tool_A_flag equal to 0 species the absence of tool_A_parameter( ).
tool_B_flag equal to 1 specifies the presence of tool_B_parameter( ). tool_B_flag equal to 0 species the absence of tool_B_parameter( ).

FIG. 6A-6B illustrate an example of syntax structure for referencing a parameter set for tool parameters in a header of a picture or a picture region. For example, the syntax structure in FIG. 6A-6B can be used in a header of a tile group. The semantics of region_parameter_set_id is as follow.
region_parameter_set_id specifies the value of parameter_set_id for the parameter set in use. A parameter set with its parameter set identifier equal to region_parameter_set_id will have info_type equal to 0.

In FIG. 6A, region_parameter_set_id is always presented in a header of a picture or a picture region. In FIG. 6B, the presence of region_parameter_set_id in a header of a picture or a picture region is conditioned with whether at least one of tool A and tool B is enabled. Generally, entropy coding unit 215 codes tool_A_enable_flag and tool_B_enable in a parameter set for multiple pictures or a coded video sequence, for example, in SPS.

Using the syntax structure in FIG. 5 and FIG. 6A-6B, entropy coding unit 215 codes tool parameters for tool A and tool B. Specially, if an encoder does not update any of the tool parameters, entropy coding unit 215 sets region_parameter_set_id equal to an identifier of an existing parameter set.

Step 101: Entropy coding unit 215 sets an identifier parameter equal to a parameter set identifier which corresponds to a parameter set containing the tool parameter.

Entropy coding unit 215 checks whether the tool parameter is identical to a tool parameter in an existing parameter set. If yes, entropy coding unit 215 sets an identifier parameter equal to a parameter set identifier which corresponds to an existing parameter set containing the tool parameter. An example implementation in an encoder is to first check whether the already existing tool parameters are suitable for coding the picture or the picture region. For example, entropy coding unit 215 finds that a tool A parameter is identical to the one in an existing parameter set with its parameter set identifier equal to 1.

Otherwise, entropy coding unit 215 generates a second parameter set, assigns a second parameter set identifier to the second parameter set, sets an indication parameter in the second parameter set to a value indicating that a tool parameter contained in the second parameter set is only the tool parameter, and codes tool parameter in the second parameter set. For example, entropy coding unit 215 generates a parameter set for tool B parameters as following according to the syntax structure in FIG. 5:

```
parameter_set_rbsp ( ) {
    parameter_set_id = 2
    info_type = 2
    tool_B_parameter( ) = tool B parameters
    one or more extension and byte align bits
}
```

Step 102: Entropy coding unit 215 generates a first parameter set, assigns a first parameter set identifier to the first parameter set, codes a tool flag corresponding to the tool in the first parameter set equal to a value indicating that the tool parameter is presented or the tool is enabled in encoding the picture or the picture region, and coding the identifier parameter in the first parameter set; wherein the first parameter is of the same type as the parameter set containing the tool parameter. Note that two parameter sets are of the same type if the type of RBSP (Raw Byte Sequence Payload) data structure contained in the NAL (Network Abstraction Layer) unit with a syntax element specifying NAL unit type (i.e. nal_unit_type) of the same value. Parsing unit 701 obtains the tool parameter from the second parameter set.

Entropy coding unit 215 generates a first parameter set for tool parameters of tool A and tool B as following according to the syntax structure in FIG. 5:

```
parameter_set_rbsp ( ) {
    parameter_set_id = 3
    info_type = 0
    tool_A_flag = 1
    tool_A_parameter_set_id = 1
    tool_B_flag = 1
    tool_B_parameter_set_id = 2
    one or more extension and byte align bits
}
```

Step 103: Entropy coding unit 215 codes the first parameter set identifier in a header of the picture or the picture region.

Entropy coding unit 215 sets region_parameter_set_id in FIG. 6A-6B equal to 3, and codes region_parameter_set_id in a header of the picture or the picture region (e.g. tile group, or tile).

Note that an encoder can invoke steps 101, 102 and 103 in the process of encoding a picture or a picture region. The encoder then codes the picture or the picture region using the tool parameter. Entropy coding unit 215 also writes the coding bits of the above-mentioned data into a bitstream.

Specially, if parameters of both tool A and tool B are already presented in existing parameter sets, the method for handling tool A parameter in the above-mentioned steps 101, 102 and 103 is used to code tool parameters in parameter sets.

Specially, if parameters of tool A and tool B are not presented in existing parameter sets, the method for handling tool B parameter in the above-mentioned steps 101, 102 and 103 is used to code tool parameters in parameter sets.

Embodiment 2

Figure 7:
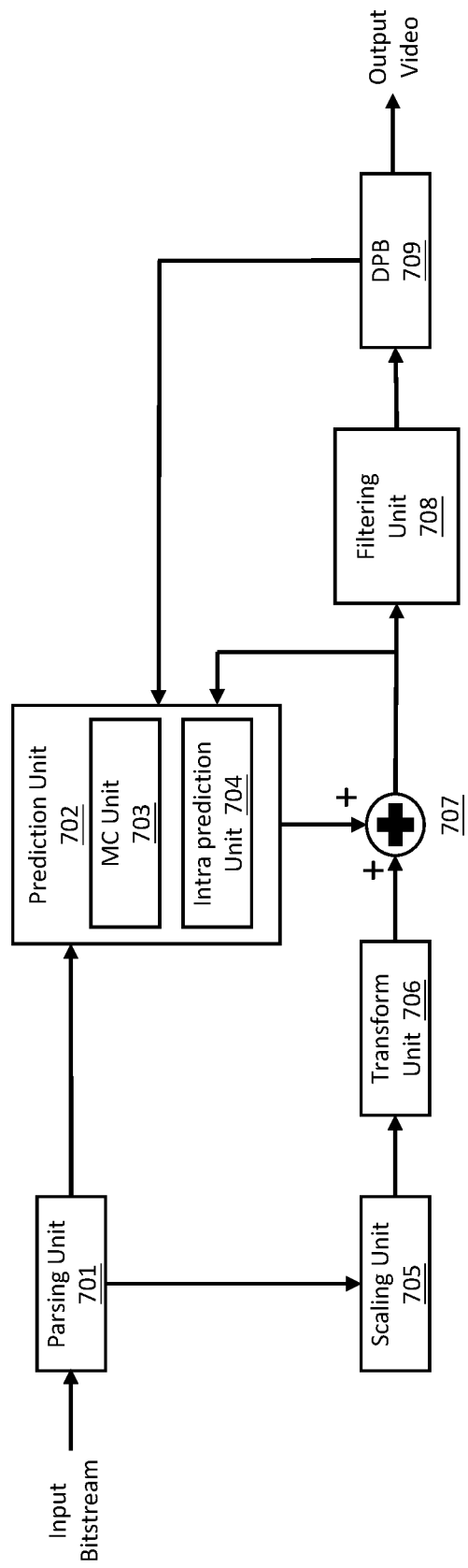
FIG. 7 is a diagram illustrating an example video or picture decoder that implements the methods in this disclosure.

FIG. 7 is a diagram illustrating a decoder utilizing the method in this disclosure in decoding a bitstream generated by the aforementioned encoder in embodiment 1. Input of the decoder is a bitstream, and output of the decoder is decoded video or picture obtained by decoding the bitstream.

Parsing unit 701 in the decoder parses the input bitstream. Parsing unit 701 uses entropy decoding methods and binarization methods specified in a standard to convert each code word in the bitstream consisting of one or more binary symbols (i.e. "0" and "1") to a numerical value of a corresponding parameter. Parsing unit 701 also derives parameter value according to one or more available parameters. For example, when there would be a flag in the bitstream indicating a decoding block is the first one in a picture, parsing unit 701 setting an address parameter, which indicates an address of the first decoding block of a picture region, to be 0.

In the input bitstream of parsing unit 701, the syntax structures for representing tool parameters are illustrated in FIG. 5 and FIG. 6A-6B.

FIG. 5 is a diagram illustrating an example of syntax structure for representing parameters of multiple tools in a parameter set. The semantics of the syntax elements in FIG. 5 are presented as follows.

parameter_set_id identifies a parameter set for reference by other syntax elements.

info_type specifies a type of information in a parameter set.

tool_A_flag equal to 1 specifies that tool A is used. tool_A_flag equal to 0 specifies that tool A is not used.

tool_B_flag equal to 1 specifies that tool B is used. tool_B_flag equal to 0 specifies that tool B is not used.

Alternatively, the semantics for tool_A_flag and tool_B_flag can be as follows.

tool_A_flag equal to 1 specifies the presence of tool_A_parameter( ). tool_A_flag equal to 0 species the absence of tool_A_parameter( ).

tool_B_flag equal to 1 specifies the presence of tool_B_parameter( ). tool_B_flag equal to 0 species the absence of tool_B_parameter( ).

FIG. 6A-6B illustrate an example of syntax structure for referencing a parameter set for tool parameters in a header of a picture or a picture region. For example, the syntax structure in FIG. 6A-6B can be in a header of a tile group. The semantics of region_parameter_set_id is as follow.

region_parameter_set_id specifies the value of parameter_set_id for the parameter set in use. A parameter set with its parameter set identifier equal to region_parameter_set_id will have info_type equal to 0.

In FIG. 6A, region_parameter_set_id is always presented in a header of a picture or a picture region. In FIG. 6B, the presence of region_parameter_set_id in a header of a picture or a picture region is conditioned with whether at least one of tool A and tool B is enabled.

In decoding process, parsing unit 701 parses the bitstream to obtain a first parameter set identifier from a data unit containing bits corresponding to a coded picture or a coded picture region. Corresponding to the aforementioned examples of an encoder using syntax structure in FIG. 6A-6B, parsing unit 701 obtains region_parameter_set_id (equal to 3) from a header of the coded picture or the coded picture region (e.g. tile group, or tile).

Parsing unit 701 activates a first parameter set with its identifier equal to the first parameter set identifier. As Corresponding to the aforementioned examples of an encoder using syntax structure in FIG. 5, in the first parameter set with its parameter identifier equal to 3, parsing unit 701 obtains the values of syntax elements as following:

```
parameter_set_rbsp ( ) {
    parameter_set_id = 3
    info_type = 0
    tool_A_flag = 1
    tool_A_parameter_set_id = 1
    tool_B_flag = 1
    tool_B_parameter_set_id = 2
    one or more extension and byte align bits
}
```

If the tool flag indicates a tool parameter of a tool corresponding to the tool flag is presented or the tool corresponding to the tool flag is enabled in decoding the coded picture or the coded picture region, parsing unit 701 obtains a second parameter set identifier from the first parameter set. Then parsing unit 701 activates a second parameter set, which is of the same type as the first parameter set, with its identifier equal to the second parameter set identifier; wherein an indication parameter in the second parameter set indicates that a tool parameter contained in the second parameter set is only the tool parameter of the tool corresponding to the tool flag. Note that two parameter sets are of the same type if the type of RBSP (Raw Byte Sequence Payload) data structure contained in the NAL (Network Abstraction Layer) unit with a syntax element specifying NAL unit type (i.e. nal_unit_type) of the same value. Parsing unit 701 obtains the tool parameter from the second parameter set.

In the above example, regarding tool A, parsing unit 701 first checks a value of tool_A_flag. As tool_A_flag is equal to 1, parsing unit 701 obtains a value of tool_A_parameter_set_id (i.e. equal to 1) from the parameter set with parameter_set_id equal to 3. Parsing unit 701 activates a parameter set with its parameter set identifier equal to 1, and obtains tool A parameters.

Regarding tool B, parsing unit 701 then checks a value of tool_B_flag obtained from the parameter set with parameter_set_id equal to 3. As tool_B_flag is equal to 1, parsing unit 701 obtains a value of tool_B_parameter_set_id (i.e. equal to 2) from the parameter set with parameter_set_id equal to 3. Parsing unit 701 activates a parameter set with its parameter set identifier equal to 1, and obtains tool B parameters.

Additionally, if tool_A_flag (or tool_B_flag) in the parameter set with parameter_set_id equal to 3 indicate whether tool A (or tool B) is used in decoding the coded picture or the coded picture region referring to the parameter set with parameter_set_id equal to 3, parsing unit 701 also includes this flag in tool A (or tool B) parameter.

Parsing unit 701 passes tool A parameters and tool B parameters to the other units in a decoder to decode the coded picture or the coded picture region using these tool parameters.

Parsing unit 701 passes one or more prediction parameters for deriving prediction samples of a decoding block to prediction unit 702. In this disclosure, the prediction parameters include output parameters of partitioning unit 201 and prediction unit 202 in the aforementioned encoder.

Parsing unit 701 passes one or more residual parameters for reconstructing residual of a decoding block to scaling unit 705 and transform unit 706. In this disclosure, the residual parameters include output parameters of transform unit 208 and quantization unit 209 and one or more quantized coefficients (i.e. "Levels") outputted by quantization unit 209 in the aforementioned encoder.

Parsing unit 701 passes filtering parameter to filtering unit 708 for filtering (e.g. in-loop filtering) reconstructed samples in a picture.

Prediction unit 702 derives prediction samples of a decoding block according to the prediction parameters. Prediction unit 702 is composed of MC unit 703 and intra prediction unit 704. Input of prediction unit 702 may also include reconstructed part of a current decoding picture outputted from adder 707 (which is not processed by filtering unit 708) and one or more decoded pictures in DPB 709.

When the prediction parameters indicate inter prediction mode is used to derive prediction samples of the decoding block, prediction unit 702 employs the same approach as that for ME unit 204 in the aforementioned encoder to construct one or more reference picture lists. A reference list contains one or more reference pictures from DPB 709. MC unit 703 determines one or more matching blocks for the decoding block according to indication of reference list, reference index and MV in the prediction parameters, and uses the same method as that in MC unit 205 in the aforementioned encoder to get inter prediction samples of the decoding block. Prediction unit 702 outputs the inter prediction samples as the prediction samples of the decoding block.

Specially and optionally, MC unit 703 may use the current decoding picture containing the decoding block as reference to obtain intra prediction samples of the decoding block. In this disclosure, by intra prediction is meant that only the data in a picture containing a coding block is employed as reference for derive prediction samples of the coding block. In this case, MC unit 703 use reconstructed part in the current picture, wherein the reconstructed part is from the output of adder 707 and is not processed by filtering unit 708. For example, the decoder allocates a picture buffer to (temporally) store output data of adder 707. Another method for the decoder is to reserve a special picture buffer in DPB 709 to keep the data from adder 707.

When the prediction parameters indicate intra prediction mode is used to derive prediction samples of the decoding block, prediction unit 702 employs the same approach as that for intra prediction unit 206 in the aforementioned encoder to determine reference samples for intra prediction unit 704 from reconstructed neighboring samples of the decoding block. Intra prediction unit 704 gets an intra prediction mode (i.e. DC mode, Planar mode, or an angular prediction mode) and derives intra prediction samples of the decoding block using reference samples following specified process of the intra prediction mode. Note that identical derivation process of an intra prediction mode is implemented in the aforementioned encoder (i.e. intra prediction unit 206) and the decoder (i.e. intra prediction unit 704). Specially, if the prediction parameters indicate a matching block (including its location) in the current decoding picture (which contains the decoding block) for the decoding block, intra prediction unit 704 use samples in the matching block to derive the intra prediction samples of the decoding block. For example, intra prediction unit 704 sets intra prediction samples equal to the samples in the matching block. Prediction unit 702 sets prediction samples of the decoding block equal to intra prediction samples outputted by intra prediction unit 704.

The decoder passes QP, including luma QP and chroma QP, and quantized coefficients to scaling unit 705 for process of inverse quantization to get reconstructed coefficients as output. The decoder feeds the reconstructed coefficients from scaling unit 705 and transform parameter in the residual parameter (i.e. transform parameter in output of transform unit 208 in the aforementioned encoder) into transform unit 706. Specially, if the residual parameter indicates to skip scaling in decoding a block, the decoder guides the coefficients in the residual parameter to transform unit 706 by bypassing scaling unit 705.

Transform unit 706 performs transform operations on the input coefficients following a transform process specifies in a standard. Transform matrix used in transform unit 706 is the same as that used in inverse transform unit 211 in the aforementioned encoder. Output of transform unit 706 is a reconstructed residual of the decoding block.

Generally, since only decoding process is specified in a standard, from the perspective view of a video coding standard, process and related matrix in decoding process is specified as "transform process" and "transform matrix" in a standard text. Thus, in this disclosure, the description on the decoder names the unit implementing a transform process specified in a standard text as "transform unit" to coincide with the standard. However, this unit can always be named as "inverse transform unit" based on the consideration of taking decoding process as an inverse process of encoding.

Adder 707 takes the reconstructed residual in output of transform unit 706 and the prediction samples in output of prediction unit 702 as input data, calculates reconstructed samples of the decoding block. Adder 707 stores the reconstructed samples into a picture buffer. For example, the decoder allocates a picture buffer to (temporally) store output data of adder 707. Another method for the decoder is to reserve a special picture buffer in DPB 709 to keep the data from adder 707.

The decoder passes filtering parameter from parsing unit 701 to filtering unit 708. The filtering parameter for filtering 708 is identical to the filtering parameter in the output of filtering unit 213 in the aforementioned encoder. The filtering parameter includes indication information of one or more filters to be used, filter coefficients and filtering control parameter. Filtering unit 708 performs filtering process using the filtering parameter on reconstructed samples of a picture stored in decoded picture buffer and outputs a decoded picture. Filtering unit 708 may consist of one filter or several cascading filters. For example, according to H.265/HEVC standard, filtering unit is composed of two cascading filters, i.e. deblocking filter and sample adaptive offset (SAO) filter. Filtering unit 708 may include adaptive loop filter (ALF). Filtering unit 708 may also include neural network filters. Filtering unit 708 may start filtering reconstructed samples of a picture when reconstructed samples of all coding blocks in the picture have been stored in decoded picture buffer, which can be referred to as "picture layer filtering". Optionally, an alternative implementation (referred to as "block layer filtering") of picture layer filtering for filtering unit 708 is to start filtering reconstructed samples of a coding block in a picture if the reconstructed samples are not used as reference in decoding all successive coding blocks in the picture. Block layer filtering does not require filtering unit 708 to hold filtering operations until all reconstructed samples of a picture are available, and thus saves time delay among threads in a decoder.

The decoder stores the decoded picture outputted by filtering unit 708 in DPB 709. In addition, the decoder may perform one or more control operations on pictures in DPB 709 according to one or more instructions outputted by parsing unit 701, for example, the time length of a picture storing in DPB 709, outputting a picture from DPB 709, and etc.

Embodiment 3

Figure 8:
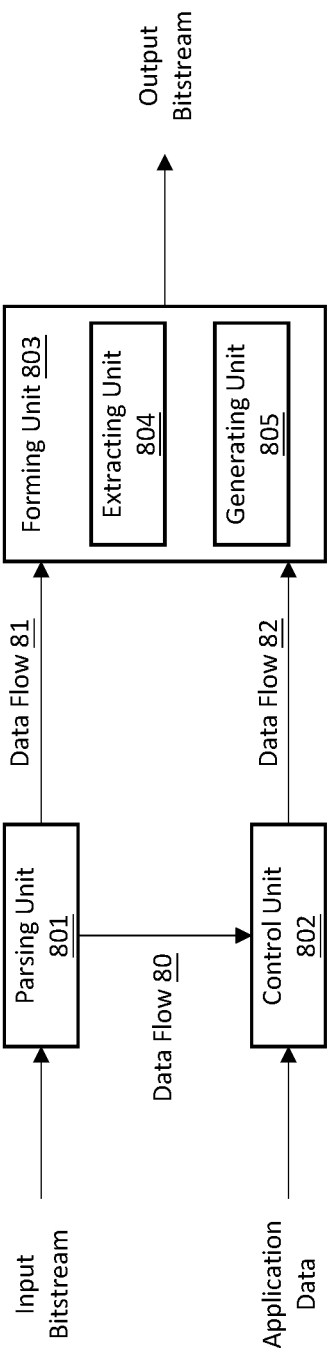
FIG. 8 is a diagram illustrating an example of an extractor that implements the methods in this disclosure.

FIG. 8 is a diagram illustrating an example of a bitstream processor that implements the methods in this disclosure.

Optionally, the bitstream processor can be configured as an extractor, which extracts a sub-bitstream from an input bitstream. One of the inputs of the extractor is a bitstream generated by the aforementioned encoder in FIG. 2. Another input of the extractor is application data which indicates a target picture region for extraction. Output of the extractor is a sub-bitstream which is decodable by the aforementioned decoder in FIG. 7. This sub-bitstream, if further extractable, can also be an input bitstream of an extractor.

Optionally, the bitstream processor can be configured as a splicer, which splices two or more bitstreams to form a spliced bitstream. One of the inputs of the splicer is two or more bitstream generated by the aforementioned encoder in FIG. 2. Another input of the splicer is application data with indicates how to present pictures corresponding to decoded pictures of the input streams in a picture corresponding to decoded pictures of the spliced bitstream. Output of the splicer is a spliced bitstream which is decodable by the aforementioned decoder in FIG. 7. This spliced bitstream can also be an input bitstream of a splicer.

Furthermore, sub-bitstream from an extractor can be an input bitstream of a splicer, and spliced bitstream can be an input bitstream of an extractor.

Syntax structures in FIG. 5 and FIG. 6A-6B are used in bitstreams involved in the extractor and the splicer. The semantics of the syntax elements in FIG. 5 are as follows.
parameter_set_id identifies a parameter set for reference by other syntax elements.
info_type specifies a type of information in a parameter set.
tool_A_flag equal to 1 specifies the presence of tool_A_parameter( ). tool_A_flag equal to 0 species the absence of tool_A_parameter( ).
tool_B_flag equal to 1 specifies the presence of tool_B_parameter( ). tool_B_flag equal to 0 species the absence of tool_B_parameter( ).
The semantics of region_parameter_set_id in FIG. 6A-6B is as follow.
region_parameter_set_id specifies the value of parameter_set_id for the parameter set in use. A parameter set with its parameter set identifier equal to region_parameter_set_id will have info_type equal to 0.
Example Embodiments of an Extractor:

The basic function of an extractor is to form a sub-bitstream from an original bitstream. For example, a user selected a region in a high-resolution video for displaying this region on his smartphone, and the smartphone sends application data to a remote device (e.g. a remote server) or an internal processing unit (e.g. a software procedure installed on this smartphone) to request for media data corresponding to the selected region (i.e. target picture region). An extractor (or equivalent processing unit) on the remote device or the internal processing unit extracts a sub-bitstream corresponding to the target picture region from a bitstream corresponding to the original high-resolution video. Another example is that an HMD (Head Mounted Device) detects a current viewport of a viewer and requests for media data for rendering this viewport. Similar to the previous example, the HMD also generates application data indicating a region in a video picture covering the final rendering region of the detected viewport (i.e. target picture region), and sends the application data to a remote device or its internal process unit. An extractor (or equivalent processing unit) on the remote device or the internal processing unit extracts a sub-bitstream corresponding to the target picture region from a bitstream corresponding to the video covering a wider rendering viewport.

In this embodiment, an example input bitstream is a bitstream generated by the aforementioned encoder by encoding a picture partitioned into two tile groups as illustrated in FIG. 4. The two tile groups are made independently decodable. That is, decoding a tile group does not reference to any information of the other tile group.

In the input bitstream of the extractor, only tool A is used in decoding tile group 4000, and only tool B is used in decoding tile group 4100. As in semantics, tool_A_flag and tool_B_flag in a parameter set indicate whether tool A parameters and tool B parameters are presented in the parameter set, respectively, an encoder generates a single parameter set to be referred to by a tile group for populating tool parameters as follows:

```
parameter_set_rbsp ( ) {
    parameter_set_id = 0
    info_type = 0
    tool_A_flag = 1
    tool_A_parameter_set_id = 1
    tool_B_flag = 1
    tool_B_parameter_set_id = 2
    one or more extension and byte align bits
}
```

In both headers of tile group 4000 and 4100, region_parameter_set_id is set equal to 0. Flag indicating whether a tool is used in decoding a tile group is available in tile group header, other parameter sets, or supplementation information.

Parsing unit 801 runs similar processing to that in parsing unit 701 to determine the parameter sets referred to by tile group 4000 and 4100, respectively. For each tile group, parsing unit 801 also parses a flag indicating whether a tool is used in decoding a tile group is available in tile group header, other parameter sets, or supplementation information. Moreover, Parsing unit 801 also parses the input bitstream to obtain a tile group parameter from one or more data units (for example, a parameter set data unit) in the input bitstream. The tile group parameter indicates a partitioning manner of a picture into tile groups and tiles with maybe one or more tile identifiers correspondingly. Parsing unit 801 puts the tool parameter information, tile group parameter and other necessary data for determining the target tiles for extraction (e.g. picture width and height) in data flow 80 and sends data flow 80 to control unit 802. Parsing unit 801 also parses the input bitstream and forwards other data to forming unit 803 via data flow 81 in the process of generating a sub-bitstream when necessary. Parsing unit 801 also includes the input bitstream in data flow 81.

Note that data flow in this disclosure refers to input parameters and returning parameters of a function in software implementations, data transmission on a bus and data sharing among storage units (also including data sharing among registers) in hardware implementations.

Control unit 802 obtains a target picture region from its input of application data, including location and size of the target picture region in a picture. Control unit 802 obtains the tile group parameters and the width and height of a picture from data flow 80. Control unit 802 determines one or more target tile groups or tiles located in the target picture region. In this example, suppose that the target picture region is tile group 4000. Control unit 802 puts address of the target tile group (e.g. an address of the first tile of tile group 4000 in picture 40) and other information (e.g. size of the target picture region targetPicWidth and targetPicHeight) in data flow 82.

Forming unit 803 receives data flow 81 and 82, extracts data units from the input bitstream forwarded in data flow 81, generates new parameter sets according to the new parameters for target picture region when necessary and then forms a sub-bitstream by composing the extracted data units and parameter sets. Forming unit 803 includes extracting unit 804 and generating unit 805. When extracting unit 804 detects a tile group with its address equal to tile group 4000, extracting unit 804 extracts a data unit of this tile group from the input bitstream. Extracting unit 804 also extracts one or more parameter sets referred to by tile group 4000.

Generating unit 805 generates output sub-bitstream by splicing extracted data units of tile group 4000 and one or more parameter set data units. When needed, generating unit 805 also performs rewriting operations on tile group header, including tile group address, parameter set identifier, and etc. In this example, as only tool A is used in decoding tile group 4000, generating unit 805 rewrites the parameter set with its parameter set identifier equal to 0 to remove tool B parameters (i.e. set tool_B_flag equal to 0) which are not used in decoding tile group 4000 as follows.

```
parameter_set_rbsp ( ) {
    parameter_set_id = 0
    info_type = 0
    tool_A_flag = 1
    tool_A_parameter_set_id = 1
    tool_B_flag = 0
    one or more extension and byte align bits
}
```

In addition, generating unit 805 also removes parameter sets containing tool B parameters from the bitstream forwarded by extracting unit 804. Generating unit 805 removes data units of one or more parameter sets with info_type equal to 2. Note that such removal operations can also be implemented in extraction unit 804 instead of generating unit 805.

Forming unit 803 arranges the data units to form a sub-bitstream according to a specified bitstream structure of a video coding standard. Output of forming unit 803 is the sub-bitstream, which is decodable by the aforementioned decoder in FIG. 7.

Example Embodiments of a Splicer:

The basic function of a splicer is to form a bitstream from two or more input bitstreams. One example is in stereo video applications, e.g. 360-degree omnidirectional video in a form of frame-compatible type (take left-right type for example). In FOV (field of viewport) based streaming, a bitstream corresponding to a picture region covering the current viewport of a viewer is sent to a destination device for rendering. Such a bitstream will be formed with a left picture region in left half of a picture in frame-compatible format for left view and a right picture region in right half of the picture in frame-compatible format for right view. The splicer will combine the left picture region and the right picture in a frame-compatible format (e.g. lift-right type) to form a new spliced bitstream.

Suppose picture 40 in FIG. 4 is a picture of the spliced bitstream. Tile group 4000 corresponds to the left picture region, and tile group 4100 corresponds to the right picture region. In decoding tile group 4000, only tool A is used. A parameter set for tile group 4000 for the left view is as follows.

```
parameter_set_rbsp ( ) {
    parameter_set_id = 0
    info_type = 0
    tool_A_flag = 1
    tool_A_parameter_set_id = 1
    tool_B_flag = 0
    one or more extension and byte align bits
}
```

In decoding tile group 4100, only tool A is used. A parameter set for tile group 4100 for the right view is as follows.

```
parameter_set_rbsp ( ) {
    parameter_set_id = 1
    info_type = 0
    tool_A_flag = 0
    tool_B_flag = 1
    tool_B_parameter_set_id = 2
    one or more extension and byte align bits
}
```

Parsing unit 801 runs similar processing to that in parsing unit 701 to determine the parameter sets referred to by tile group 4000 and 4100, respectively. In this example, the input bitstreams can be two bitstreams extracted from a frame-compatible 360 degree omnidirectional stereo video bitstream. For each tile group, parsing unit 801 also parses a flag indicating whether a tool is used in decoding a tile group is available in tile group header, other parameter sets, or supplementation information. Parsing unit 801 puts the tool parameter information, tile group parameter and other necessary data for determining the parameters for spliced bitstream (e.g. picture width and height) in data flow 80 and sends data flow 80 to control unit 802. Parsing unit 801 also parses the input bitstream and forwards other data to forming unit 803 via data flow 81 in the process of splicing when necessary. Parsing unit 801 also includes the input bitstreams in data flow 81.

Control unit 802 obtains a target picture from its input of application data, including location and size of the left picture and the right picture in the target picture. Control unit 802 obtains the width and height of the left picture and the right picture from data flow 80. In this example, control unit 802 determines the location of the left picture as tile group 4000 in FIG. 4 and the location of the right picture as tile group 4100. Control unit 802 puts locations of the target tile groups (e.g. an address of the first tiles of tile groups 4000 and 4100 in picture 40) and other information (e.g. size of the target picture targetPicWidth and targetPicHeight) in data flow 82.

Forming unit 803 receives data flow 81 and 82, reads data units from the input bitstream forwarded in data flow 81, generates new parameter sets according to the new parameters for target picture when necessary and then forms a spliced bitstream by composing the data units and parameter sets. Forming unit 803 includes extracting unit 804 and generating unit 805. When extracting unit 804 detects a tile group with its address equal to tile group 4000, extracting unit 804 extracts a data unit of this tile group from the input bitstream. Extracting unit 804 also extracts one or more parameter sets referred to by tile group 4000. Specially, In this example, since the input bitstream of the left picture contains only tile group 4000, extracting unit 804 does not need to perform further extraction operations on this input bitstream. Extracting unit 804 carries out the same operations on tile group 4100.

Generating unit 805 generates output bitstream by splicing extracted data units of tile group 4000, tile group 4100 and one or more parameter set data units. When needed, generating unit 805 also performs rewriting operations on tile group header, including tile group address, parameter set identifier, and etc. In this example, generating unit 805 rewrites tile group address in headers of tile groups 4000 and 4100. Generating unit 805 generates new SPS and PPS with size of the target picture and tile group parameters indicating a tile group partition as illustrated in FIG. 4, as well as other necessary parameters (e.g. Profile/Tier/Level). Generating unit 805 puts data units of tile group 4000 and 4100 in a same access unit. Generating unit 805 generates a new parameter set for tool parameters as follows. Generating unit 805 sets parameter set identifiers in tile group header to corresponding values of newly generated parameter sets.

```
parameter_set_rbsp ( ) {
    parameter_set_id = 0
    info_type = 0
    tool_A_flag = 1
    tool_A_parameter_set_id = 1
    tool_B_flag = 1
    tool_B_parameter_set_id = 2
    one or more extension and byte align bits
}
```

Forming unit 803 arranges the data units to form a bitstream according to a specified bitstream structure of a video coding standard. Output of forming unit 803 is a spliced bitstream, which is decodable by the aforementioned decoder in FIG. 7. Moreover, the spliced bitstream can also be an input of the aforementioned extractor to get a sub-bitstream containing only tile group 4000 or 4100. The spliced bitstream can also be one of the input bitstreams of this splicer to generate a new spliced bitstream.

Note that in this example, both the left picture region and the right picture are from a single original bitstream of frame-compatible stereo 360 degree omnidirectional video bitstream, no duplicated parameter set identifiers exists in this original bitstream. If the left picture region and the right picture region are from two separate bitstreams, the parameter sets to form the spliced bitstream may have be duplicated parameter set identifiers. To deal with this case, the splicer will arrange parameter set identifiers to the parameter sets and rewrites corresponding syntax element in parameter sets and tile group headers.

Embodiment 4

Figure 9:
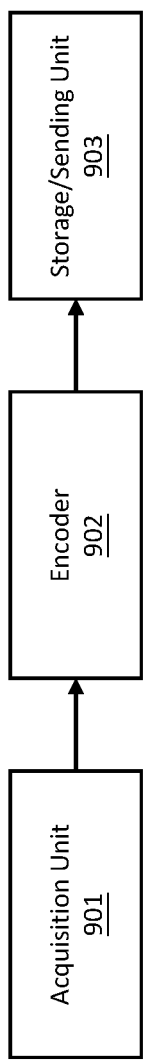
FIG. 9 is a diagram illustrating a first example device including at least the example encoder described in this disclosure.

FIG. 9 is a diagram illustrating a first example device containing at least the example video encoder or picture encoder as illustrated in FIG. 2.

Acquisition unit 901 captures video and picture. Acquisition unit 901 may be equipped with one or more cameras for shooting a video or a picture of nature scene. Optionally, acquisition unit 901 may be implemented with a camera to get depth video or depth picture. Optionally, acquisition unit 901 may include a component of an infrared camera. Optionally, acquisition unit 901 may be configured with a remote sensing camera. Acquisition unit 901 may also be an apparatus or a device of generating a video or a picture by scanning an object using radiation.

Optionally, acquisition unit 901 may perform pre-processing on video or picture, for example, automatic white balance, automatic focusing, automatic exposure, backlight compensation, sharpening, denoising, stitching, up-sampling/down sampling, frame-rate conversion, virtual view synthesis, and etc.

Acquisition unit 901 may also receive a video or picture from another device or processing unit. For example, acquisition unit 901 can be a component unit in a transcoder. The transcoder feeds one or more decoded (or partial decoded) pictures to acquisition unit 901. Another example is that acquisition unit 901 get a video or picture from another device via a data link to that device.

Note that acquisition unit 901 may be used to capture other media information besides video and picture, for example, audio signal. Acquisition unit 901 may also receive artificial information, for example, character, text, computer-generated video or picture, and etc.

Encoder 902 is an implementation of the example encoder illustrated in FIG. 2 or the source device in FIG. 9. Input of encoder 902 is the video or picture outputted by acquisition unit 901. Encoder 902 encodes the video or picture and outputs generated a video or picture bitstream.

Storage/Sending unit 903 receives the video or picture bitstream from encoder 902, and performs system layer processing on the bitstream. For example, storage/sending unit 903 encapsulates the bitstream according to transport standard and media file format, for example, e.g. MPEG-2 TS, ISOBMFF, DASH, MMT, and etc. Storage/Sending unit 903 stores the transport stream or media file obtained after encapsulation in memory or disk of the first example device, or sends the transport stream or media file via wireline or wireless networks.

Note that besides the video or picture bitstream from encoder 902, input of storage/sending unit 903 may also include audio, text, image, graphic, and etc. Storage/sending unit 903 generates a transport or media file by encapsulating such different types of media bitstreams.

The first example device described in this embodiment can be a device capable of generating or processing a video (or picture) bitstream in applications of video communication, for example, mobile phone, computer, media server, portable mobile terminal, digital camera, broadcasting device, CDN (content distribution network) device, surveillance camera, video conference device, and etc.

Embodiment 5

Figure 10:
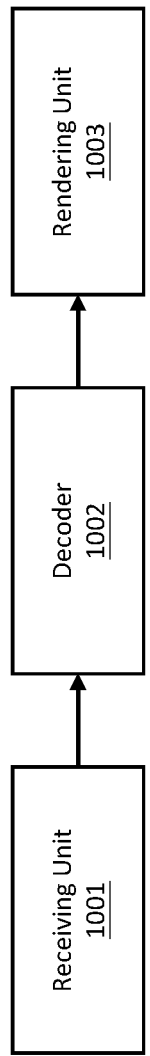
FIG. 10 is a diagram illustrating a second example device including at least the example decoder described in this disclosure.

FIG. 10 is a diagram illustrating a second example device containing at least the example video decoder or picture decoder as illustrated in FIG. 7.

Receiving unit 1001 receives video or picture bitstream by obtaining bitstream from wireline or wireless network, by reading memory or disk in an electronic device, or by fetching data from other device via a data link.

Input of receiving unit 1001 may also include transport stream or media file containing video or picture bitstream.

Receiving unit 1001 extracts video or picture bitstream from transport stream or media file according to specification of transport or media file format.

Receiving unit 1001 outputs and passes video or picture bitstream to decoder 1002. Note that besides video or picture bitstream, output of receiving unit 1001 may also include audio bitstream, character, text, image, graphic and etc. Receiving unit 1001 passes the output to corresponding processing units in the second example device. For example, receiving unit 1001 passes the output audio bitstream to audio decoder in this device.

Decoder 1002 is an implementation of the example decoder illustrated in FIG. 7. Input of encoder 1002 is the video or picture bitstream outputted by receiving unit 1001. Decoder 1002 decodes the video or picture bitstream and outputs decoded video or picture.

Rendering unit 1003 receives the decoded video or picture from decoder 1002. Rendering unit 1003 presents the decoded video or picture to viewer. Rendering unit 1003 may be a component of the second example device, for example, a screen. Rendering unit 1003 may also be a separate device from the second example device with a data link to the second example device, for example, projector, monitor, TV set, and etc. Optionally, rendering 1003 performs post-processing on the decoded video or picture before presenting it to viewer, for example, automatic white balance, automatic focusing, automatic exposure, backlight compensation, sharpening, denoising, stitching, up-sampling/down sampling, frame-rate conversion, virtual view synthesis, and etc.

Note that besides decoded video or picture, input of rendering unit 1003 can be other media data from one or more units of the second example device, for example, audio, character, text, image, graphic, and etc. Input of rendering unit 1003 may also include artificial data, for example, lines and marks drawn by a local teacher on slides for attracting attention in remote education application. Rendering unit 1003 composes the different types of media together and then presented the composition to viewer.

The second example device described in this embodiment can be a device capable of decoding or processing a video (or picture) bitstream in applications of video communication, for example, mobile phone, computer, set-top box, TV set, HMD, monitor, media server, portable mobile terminal, digital camera, broadcasting device, CDN (content distribution network) device, surveillance, video conference device, and etc.

Embodiment 6

Figure 11:
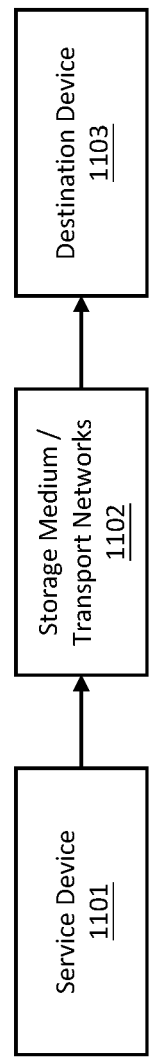
FIG. 11 is a diagram illustrating an electronic system including the first example device and the second example device.

FIG. 11 is a diagram illustrating an electronic system containing the first example device in FIG. 9 and the second example device in FIG. 10.

Service device 1101 is the first example device in FIG. 9.

Storage medium/transport networks 1102 may include internal memory resource of a device or electronic system, external memory resource that is accessible via a data link, data transmission network consisting of wireline and/or wireless networks. Storage medium/transport networks 1102 provides storage resource or data transmission network for storage/sending unit 903 in service device 1101.

Destination device 1103 is the second example device in FIG. 10. Receiving unit 1001 in destination device 1103 receives a video or picture bitstream, a transport stream containing video or picture bitstream or a media file containing video or picture bitstream from storage medium/transport networks 1102.

FIG. 1A is a flowchart showing an example method 100 implemented by a video decoder for decoding a video bitstream. The method 100 includes obtaining (102) a first parameter set identifier from a data unit containing bits corresponding to a coded video region, obtaining (104) a tool flag from a first parameter set corresponding to the first parameter set identifier, determining (106), from the tool flag, that a tool parameter of a tool corresponding to the tool flag is present or enabled for decoding the coded video region, wherein the tool corresponds to a video coding technique, obtaining (108), based on the determining, a second parameter set identifier. For example, the second parameter set may be obtained from the first parameter set. The method 100 includes obtaining (110) the tool parameter from a second parameter set corresponding to the second parameter set identifier. In some embodiments, an indication parameter, e.g., wherein an indication parameter in the second parameter set indicates that a tool parameter contained in the second parameter set is only the tool parameter of the tool corresponding to the tool flag. For example, info_type field, described with respect to FIGS. 5, 6A, 6B may be used as the indication parameter. Compared to adaptive parameter set, in which multiple tools are signaled using the same single adaptive parameter set, the indication parameter may be used to specifically indicate parameters of a single tool presented in the parameter set. The method 100 includes decoding (112) the video region using the tool parameter.

In some embodiments, the method 100 may be implemented to parse a bitstream syntax as shown in FIGS. 5, 6A-6B and examples of embodiments discussed herein. As discussed in the present document, in some embodiments, the info_type field may be used to parse to the specific tool parameters that have been signaled for use in decoding of the video region. For example, bitstream parsing (and encoding) may be simplified, as highlighted by the example embodiments, to allow for efficient and individualized signaling of tool parameters.

In some embodiments, the method 100 may be used for obtaining and using multiple parameters for video decoding. For example, the method 100 may further include obtaining another tool flag from the first parameter set, deciding, from the tool flag, that another tool parameter of another tool corresponding to the another tool flag is present or enabled for decoding the coded video region, obtaining, based on the deciding, a third parameter set identifier, obtaining the another tool parameter from a third parameter set corresponding to the third parameter set identifier. Here, the decoding the video region includes decoding the video region using the another tool parameter.

In some embodiments, the bitstream may be structured such that the network abstraction layer (NAL) units containing the second parameter set, the third parameter set and the first parameter set have a same NAL unit type. For example, a NAL unit containing the third parameter set as the same NAL unit type. In some embodiments, the network abstraction layer unit type is indicated by a fixed length code word in a NAL unit header.

In some embodiments, the obtaining the second parameter set identifier includes obtaining the second parameter set identifier from the first parameter set.

Figure 1B:
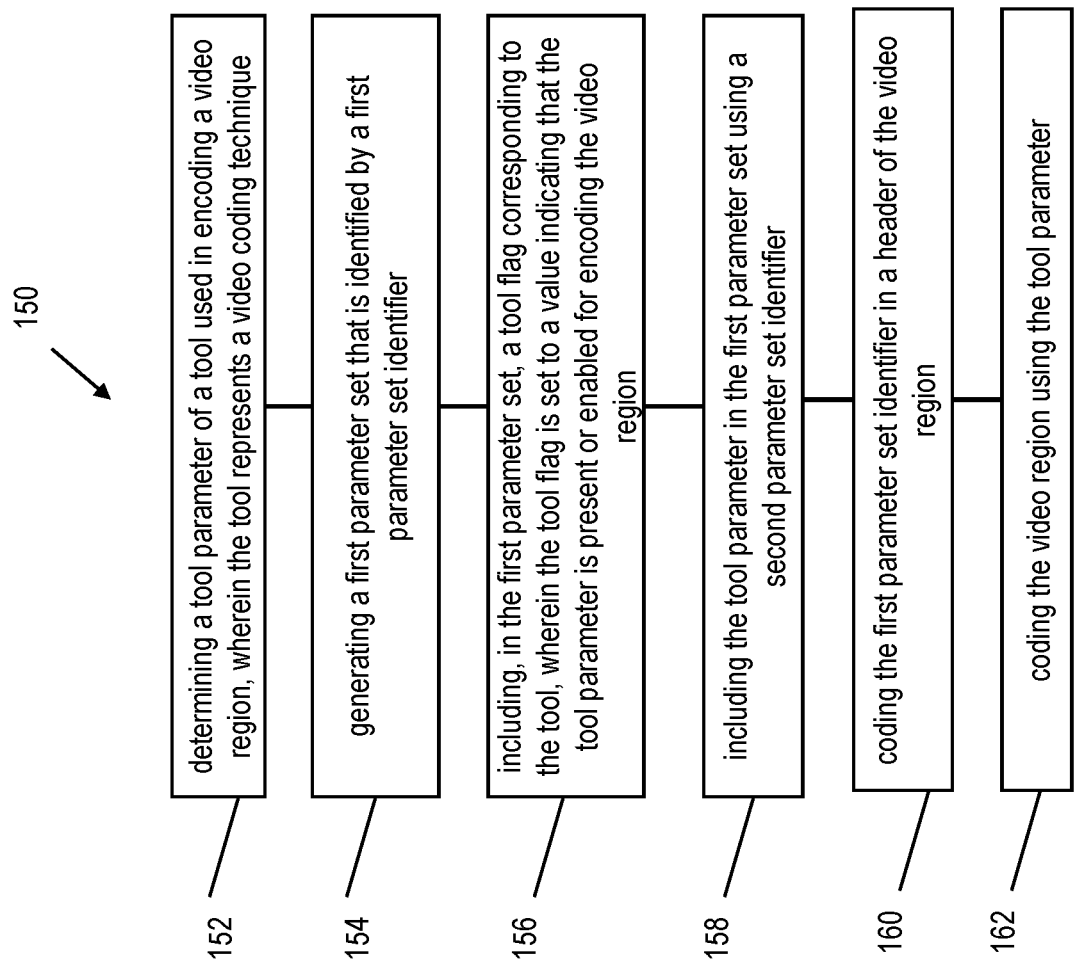
FIG. 1B is a flowchart of an example method of encoding a video region.

FIG. 1B is a flowchart for an example method 150 of video coding. The method 150 includes determining (152) a tool parameter of a tool used in encoding a video region, wherein the tool represents a video coding technique, generating (154) a first parameter set that is identified by a first parameter set identifier, including (156), in the first parameter set, a tool flag corresponding to the tool, wherein the tool flag is set to a value indicating that the tool parameter is present or enabled for encoding the video region, including (158) the tool parameter in the first parameter set using a second parameter set identifier, coding (160) the first parameter set identifier in a header of the video region, and coding (162) the video region using the tool parameter.

In various embodiments, the method 150 may be used to construct data units that are partially depicted in FIGS. 5, 6A and 6B and discussed in the example embodiments 1-5, described in the present document. The syntax of the disclosed bitstream allows for independent signaling of tool parameters for video regions using the various fields described herein.

With respect to methods 100, 150, the video region may correspond to an entire video picture. In some cases, the video region may be smaller than the video region. For example, multiple video regions may together make up an entire video picture.

With respect to methods 100, 150, in some embodiments, the video coding technique may be based on coding parameters that are common to multiple coding blocks in the coded video region. Various examples of video coding techniques or tools are provided in the present document.

In some embodiments, the method 150 may include setting, in a case that the tool parameter is identical to an existing tool parameter in an existing tool parameter set, the second parameter set identifier equal to a parameter set identifier of the existing parameter set, and generating, in case that the tool parameter is not identical to any existing tool parameter in any existing parameter set, using the second parameter set identifier having a different value than the first parameter set identifier.

In some embodiments, the method 150 may be performed to use and signal multiple parameters in the bitstream. For example, the method includes including, in the first parameter set, another tool flag corresponding to another tool, wherein the another tool flag is set to a value indicating that another tool parameter corresponding to the another tool is present or enabled for encoding the video region, and including the another tool parameter in the first parameter set using a third parameter set identifier. The coding the video region is performed using the another tool parameter.

Figure 12:
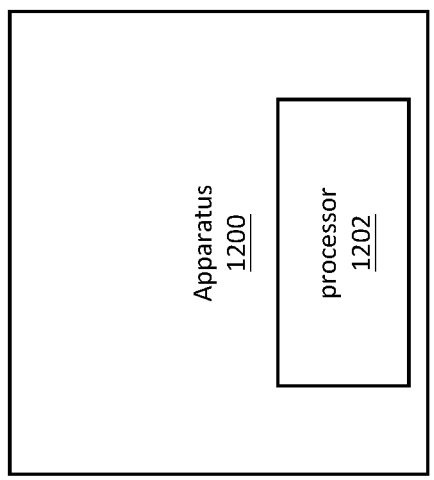
FIG. 12 shows an example of a hardware platform used for implementing a technique described in the present document.

FIG. 12 shows an example apparatus 1200 that may be used to implement encoder-side or decoder-side techniques described in the present document. The apparatus 1200 includes a processor 1202 that may be configured to perform the encoder-side or decoder-side techniques or both. The apparatus 1200 may also include a memory (not shown) for storing processor-executable instructions and for storing the video bitstream and/or display data. The apparatus 1200 may include video processing circuitry (not shown), such as transform circuits, arithmetic coding/decoding circuits, look-up table based data coding techniques and so on. The video processing circuitry may be partly included in the processor and/or partly in other dedicated circuitry such as graphics processors, field programmable gate arrays (FPGAs) and so on.

The electronic system described in this embodiment can be a device or system capable of generating, storing or transporting, and decoding a video (or picture) bitstream in applications of video communication, for example, mobile phone, computer, IPTV (internet protocol television) systems, OTT (over the top) systems, multimedia systems on Internet, digital TV broadcasting system, video surveillance system, potable mobile terminal, digital camera, video conference systems, and etc.

In an embodiment, specific examples in the embodiment may refer to examples described in the abovementioned embodiments and exemplary implementation methods, and will not be elaborated in the embodiment.

Obviously, those skilled in the art should know that each module or each act of the present disclosure may be implemented by a universal computing apparatus, and the modules or acts may be concentrated on a single computing apparatus or distributed on a network formed by multiple computing apparatuses, and may optionally be implemented by program codes executable for the computing apparatuses, so that the modules or acts may be stored in a storage apparatus for execution with the computing apparatuses, the shown or described acts may be executed in sequences different from those shown or described here in some circumstances, or may form each integrated circuit module respectively, or multiple modules or acts therein may form a single integrated circuit module for implementation. As a consequence, the present disclosure is not limited to any specific hardware and software combination.

The above is only the preferred embodiment of the present disclosure and not intended to limit the present disclosure. For those skilled in the art, the present disclosure may have various modifications and variations. Any modifications, equivalent replacements, improvements and the like made within the principle of the present disclosure shall fall within the scope of protection defined by the appended claims of the present disclosure.

INDUSTRIAL APPLICABILITY

From the above description, it can be known that tool parameters are coded in separate parameter sets without dependency among the parameters, and tools for encoding or decoding a tile group are configured in another separate parameter set of the same type as the parameter sets containing tool parameters, without introducing any new type of parameter set and corresponding additional activation process. When updating tool parameter of a tool, no duplicated information will be coded in a parameter set, and no tracing of a chain of activated parameter set is required for a codec. Therefore, parameters of various tools can be efficiently coded in a parameter set, and updated flexibly without increased complexity in activation and management of parameter sets. All the drawbacks in the existing methods are solved by using the aforementioned methods and devices.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of bitstream processing, comprising:
obtaining a first parameter set identifier from a data unit containing bits corresponding to a coded video region;
activating a first parameter set with its identifier equal to the first parameter set identifier;
obtaining a tool flag from the first parameter set corresponding to the first parameter set identifier;
determining, from the tool flag, that a tool parameter of a tool corresponding to the tool flag is present or enabled for decoding the coded video region, wherein the tool corresponds to a video coding technique;
obtaining, based on the determining, a second parameter set identifier from the first parameter set;
activating a second parameter set with its identifier equal to the second parameter set identifier, wherein the second parameter set includes the tool the tool parameter of a single tool present in the second parameter set;
obtaining the tool parameter from the second parameter set corresponding to the second parameter set identifier; and
decoding the video region using the tool parameter.

2. The method of claim 1, wherein the video region corresponds to a video picture.

3. The method of claim 1, wherein the video region is smaller than a video picture.

4. The method of claim 1, wherein the video coding technique is based on coding parameters that are common to multiple coding blocks in the coded video region.

5. The method of claim 1, further including:
obtaining another tool flag from the first parameter set;
deciding, from the tool flag, that another tool parameter of another tool corresponding to the another tool flag is present or enabled for decoding the coded video region;
obtaining, based on the deciding, a third parameter set identifier; and
obtaining the another tool parameter from a third parameter set corresponding to the third parameter set identifier; and
wherein the decoding the video region includes decoding the video region using the another tool parameter.

6. The method of claim 5, wherein network abstraction layer (NAL) units containing the second parameter set, the third parameter set and the first parameter set have a same NAL unit type.

7. The method of claim 5, wherein a NAL unit containing the third parameter set is a same NAL unit type as a NAL unit containing the first parameter set.

8. The method of claim 7, wherein the network abstraction layer unit type is indicated by a fixed length code word in a NAL unit header.

9. The method of claim 1, wherein the obtaining the second parameter set identifier includes obtaining the second parameter set identifier from the first parameter set.

10. The method of claim 6, wherein the third parameter set identifier is obtained from the first parameter set.

11. A method of encoding a video region, comprising:
determining a tool parameter of a tool used in encoding a video region, wherein the tool represents a video coding technique;
generating a first parameter set that is identified by a first parameter set identifier;
including, in the first parameter set, a tool flag corresponding to the tool, wherein the tool flag is set to a value indicating that the tool parameter is present or enabled for encoding the video region;
including the tool parameter in the first parameter set using a second parameter set identifier associated with a second parameter set, wherein the second parameter set includes the tool the tool parameter of a single tool present in the second parameter set;
coding the first parameter set identifier in a header of the video region; and
coding the video region using the tool parameter.

12. The method of claim 11, wherein the including step comprises:
setting, in a case that the tool parameter is identical to an existing tool parameter in an existing tool parameter set, the second parameter set identifier equal to a parameter set identifier of the existing tool parameter set;
generating, in case that the tool parameter is not identical to any existing tool parameter in any existing parameter set, using the second parameter set identifier having a different value than the first parameter set identifier.

13. The method of claim 11, wherein the video region corresponds to a video picture.

14. The method of claim 11, wherein the video region is smaller than a video picture.

15. The method of claim 11, wherein the video coding technique is based on coding parameters that are common to multiple coding blocks in the coded video region.

16. The method of claim 11, further including:
including, in the first parameter set, another tool flag corresponding to another tool, wherein the another tool flag is set to a value indicating that another tool parameter corresponding to the another tool is present or enabled for encoding the video region;
including the another tool parameter in the first parameter set using a third parameter set identifier;
wherein the coding the video region is performed using the another tool parameter.

17. The method of claim 11, wherein the second parameter set identifier is coded in the first parameter set.

18. An apparatus comprising a processor configured to implement a method, comprising:
obtaining a first parameter set identifier from a data unit containing bits corresponding to a coded video region;
activating a first parameter set with its identifier equal to the first parameter set identifier;
obtaining a tool flag from the first parameter set corresponding to the first parameter set identifier;
determining, from the tool flag, that a tool parameter of a tool corresponding to the tool flag is present or enabled for decoding the coded video region, wherein the tool corresponds to a video coding technique;
obtaining, based on the determining, a second parameter set identifier;
activating a second parameter set with its identifier equal to the second parameter set identifier, wherein the second parameter set includes the tool the tool parameter of a single tool present in the second parameter set;
obtaining the tool parameter from a second parameter set corresponding to the second parameter set identifier; and
decoding the video region using the tool parameter.

19. The apparatus of claim 18, wherein the video coding technique is based on coding parameters that are common to multiple coding blocks in the coded video region.

20. The apparatus of claim 18, further including:
obtaining another tool flag from the first parameter set;
deciding, from the tool flag, that another tool parameter of another tool corresponding to the another tool flag is present or enabled for decoding the coded video region;
obtaining, based on the deciding, a third parameter set identifier; and
obtaining the another tool parameter from a third parameter set corresponding to the third parameter set identifier; and
wherein the decoding the video region includes decoding the video region using the another tool parameter.

* * * * *